(12) United States Patent
Sakaguchi

(10) Patent No.: US 11,512,775 B2
(45) Date of Patent: Nov. 29, 2022

(54) SHIFT RANGE CONTROL DEVICE

(71) Applicant: DENSO CORPORATION, Kariya (JP)

(72) Inventor: Kouji Sakaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 273 days.

(21) Appl. No.: 16/867,838

(22) Filed: May 6, 2020

(65) Prior Publication Data

US 2020/0370644 A1 Nov. 26, 2020

(30) Foreign Application Priority Data

May 22, 2019 (JP) .............................. JP2019-096129

(51) Int. Cl.
*F16H 61/12* (2010.01)
*F16H 61/32* (2006.01)
*F16H 61/02* (2006.01)
*F16H 63/40* (2006.01)

(52) U.S. Cl.
CPC .............. *F16H 61/32* (2013.01); *F16H 61/02* (2013.01); *F16H 61/12* (2013.01); *F16H 63/40* (2013.01); *F16H 2061/1268* (2013.01); *F16H 2061/326* (2013.01)

(58) Field of Classification Search
CPC .......... F16H 61/02; F16H 61/12; F16H 61/32; F16H 2061/122; F16H 2061/1268; F16H 2061/326
See application file for complete search history.

(56) References Cited

U.S. PATENT DOCUMENTS

| 2011/0046859 | A1* | 2/2011 | Beyse | ..................... F16H 61/12 |
| | | | | 701/51 |
| 2018/0208236 | A1 | 7/2018 | Asao et al. | |
| 2019/0195354 | A1 | 6/2019 | Kamio | |
| 2019/0260324 | A1 | 8/2019 | Kuramitsu et al. | |

FOREIGN PATENT DOCUMENTS

EP 2 404 805 A1 1/2012

* cited by examiner

*Primary Examiner* — Edwin A Young
(74) *Attorney, Agent, or Firm* — Nixon & Vanderhye P.C.

(57) ABSTRACT

A shift range control device includes: multiple controllers that communicate with each other and control driving of a motor. The multiple controllers share control information, and include a first controller and a second controller. When the control information of the first controller is different from the control information of the second controller, one of the first controller and the second controller is set as a continuation controller, and a different one of the first controller and the second controller is set as a stop controller. The stop controller stops the drive control. The continuation controller performs the drive control of the motor.

13 Claims, 21 Drawing Sheets

SHIFT RANGE CONTROL DEVICE

CROSS REFERENCE TO RELATED APPLICATION

The present application claims the benefit of priority from Japanese Patent Application No. 2019-096129 filed on May 22, 2019. The entire disclosure of the above application is incorporated herein by reference.

TECHNICAL FIELD

The present disclosure relates to a shift range control device.

BACKGROUND

A shift range control device for switching a shift range by controlling driving of a motor has been proposed. For example, in a comparative example, when driving of the motor is controlled by one of two microcomputers, and an abnormality occurs in the microcomputer used for drive control of the motor, the microcomputer used for drive control of the motor is switched to another microcomputer.

SUMMARY

A shift range control device may include: multiple controllers that may communicate with each other and control driving of a motor. The multiple controllers may share control information, and include a first controller and a second controller. When the control information of the first controller may be different from the control information of the second controller, one of the first controller and the second controller may be set as a continuation controller, and a different one of the first controller and the second controller may be set as a stop controller. The stop controller may stop the drive control.

The continuation controller may perform the drive control of the motor.

BRIEF DESCRIPTION OF DRAWINGS

The above features and advantages of the present disclosure will become more apparent from the following detailed description made with reference to the accompanying drawings. In the drawings.

DETAILED DESCRIPTION

Incidentally, in the case of controlling one motor by use of the multiple controllers, for example, when commands are not consistent with each other such that one controller tries to drive the motor and the other controller tries to stop the motor, the driving of the motor may be locked or unintended operation may be performed.

One example of the present disclosure provides a shift range control device capable of appropriately switching a shift range by multiple controllers.

According to one example embodiment, a shift range control device may control driving of a motor to switch a shift range and include: multiple controllers that may communicate with each other and control the driving of the motor. The multiple controllers may share control information related to a drive control of the motor, and include a first controller and a second controller. When the control information of the first controller may be different from the control information of the second controller, one of the first controller and the second controller may be set as a continuation controller, and a different one of the first controller and the second controller may be set as a stop controller. The stop controller may stop the drive control. The continuation controller may perform the drive control of the motor.

As a result, a control mismatch caused by an inconsistent control information can be prevented, so that the shift range can be appropriately switched.

First Embodiment

Figure 1:
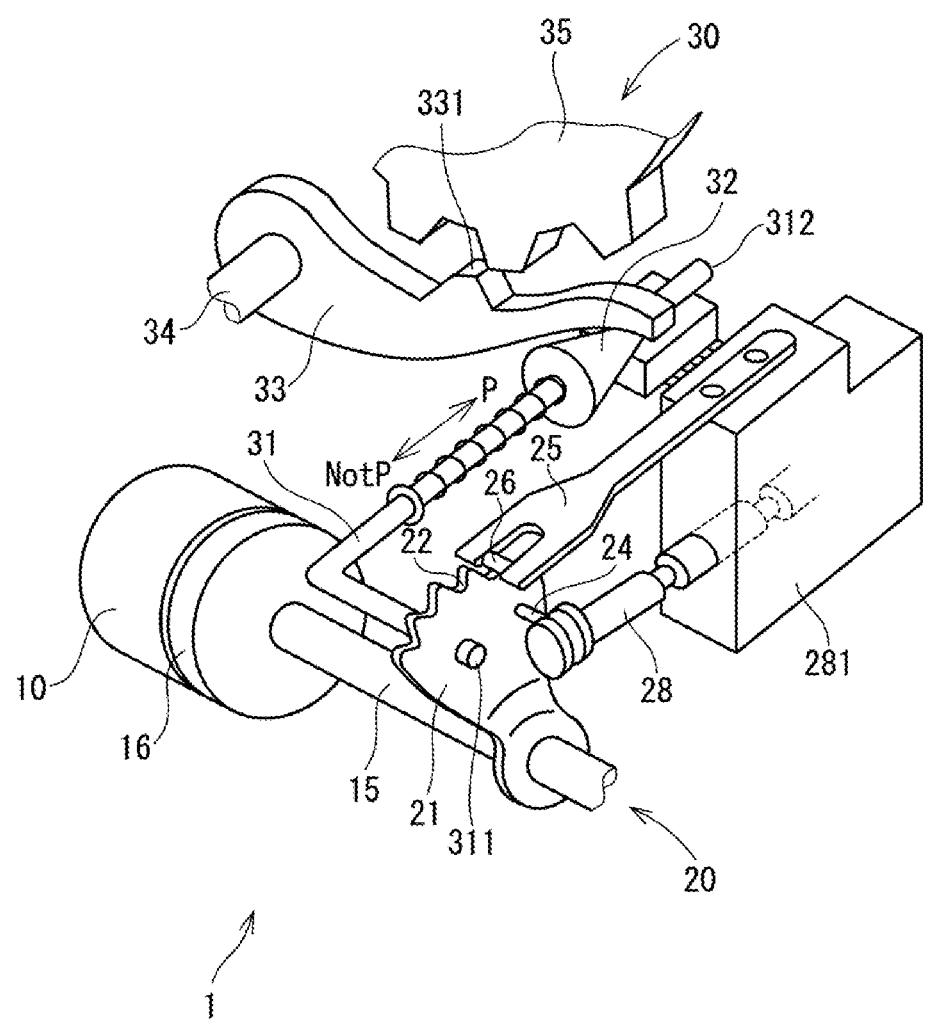
FIG. 1 is a perspective view showing a shift-by-wire system according to a first embodiment.
Figure 2:
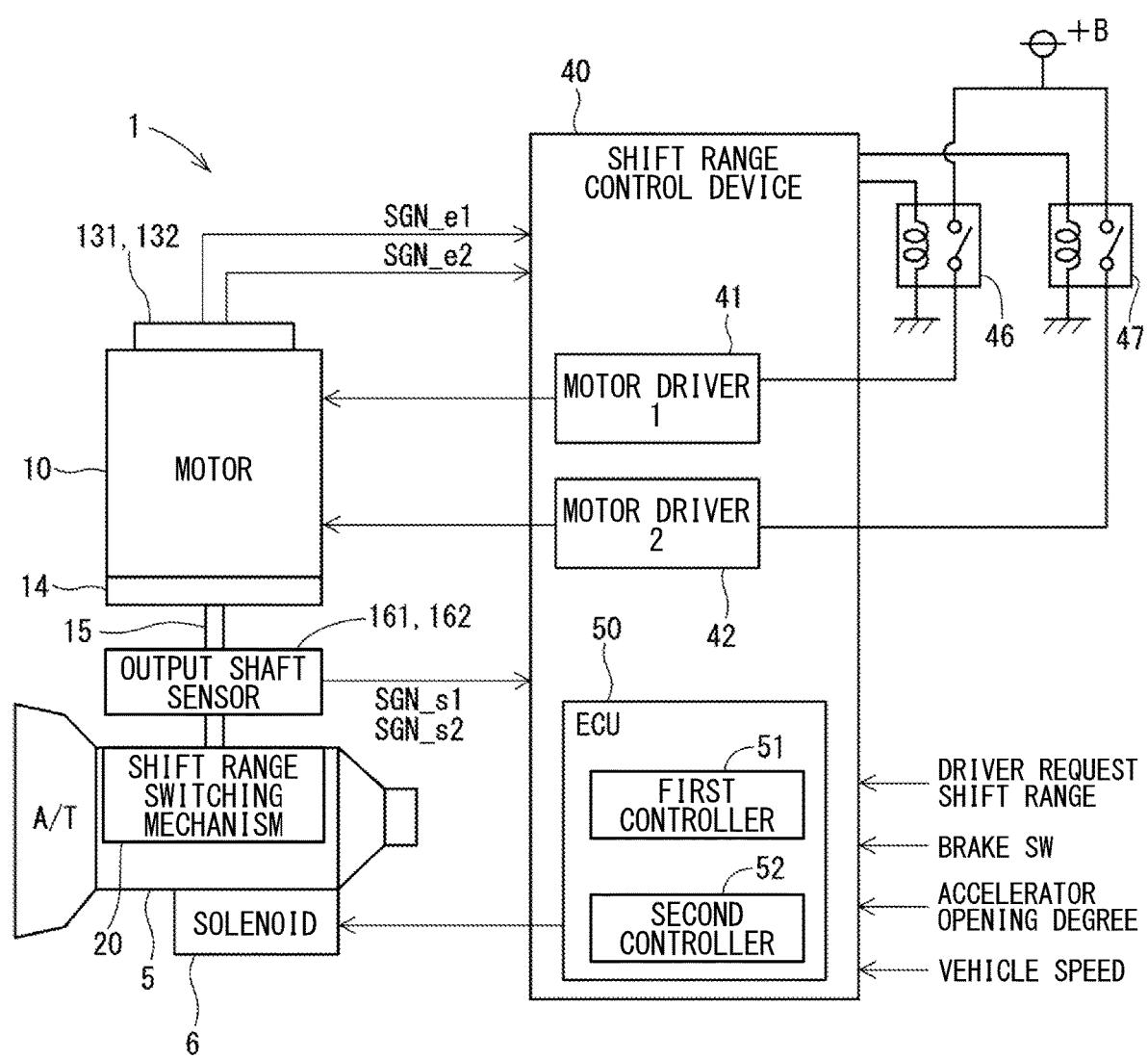
FIG. 2 is a schematic configuration diagram showing the shift-by-wire system according to the first embodiment.

Hereinafter, a shift range control device according to the present disclosure will be described with reference to the drawings. Hereinafter, in multiple embodiments, substantially the same components are denoted by the same reference numerals, and a description of the same configurations will be omitted. A first embodiment is shown in FIGS. 1 to 7. As shown in FIGS. 1 and 2, a shift-by-wire system 1 includes a motor 10, a shift range switching mechanism 20, a parking lock mechanism 30, a shift range control device 40, and the like.

The motor 10 rotates while receiving an electric power from a battery 45 mounted on a vehicle (not shown), and functions as a driving source of the shift range switching mechanism 20. The motor 10 according to the present embodiment is a DC brushless motor, but may be a switched reluctance motor or the like.

As shown in FIG. 2, encoders 131 and 132, which are motor rotation angle sensors, detect a rotation position of a rotor (not shown) of the motor 10. The encoders 131 and 132 are, for example, magnetic rotary encoders, and each includes a magnet rotating integrally with a rotor, a Hall IC for magnetic detection, and the like. The encoders 131 and 132 output encoder signals SGN_e1 and SNG_e2, which are three-phase pulse signals, at every predetermined angle in synchronization with the rotation of the rotor, respectively.

A speed reducer 14 is provided between a motor shaft 105 (refer to FIG. 5) of the motor 10 and an output shaft 15, and reduces the rotation of the motor 10 and outputs the reduced rotation to the output shaft 15. As a result, the rotation of the motor 10 is transmitted to the shift range switching mechanism 20. The output shaft 15 is provided with output shaft sensors 161 and 162 for detecting the angle of the output shaft 15, and outputs output shaft signals SGN_s1 and SGN_s2 corresponding to the rotation position of the output shaft 15. The output shaft sensors 161 and 162 are, for example, potentiometers.

As shown in FIG. 1, the shift range switching mechanism 20 includes a detent plate 21, a detent spring 25, which is an urging member, and the like, and transmits a rotation driving force output from the speed reducer 14 to a manual valve 28 and the parking lock mechanism 30. The detent plate 21 is fixed to the output shaft 15 and driven by the motor 10.

The detent plate 21 is provided with a pin 24 projecting parallel to the output shaft 15. The pin 24 is connected to a manual valve 28. When the detent plate 21 is driven by the motor 10, the manual valve 28 reciprocates in an axial direction. In other words, the shift range switching mechanism 20 converts a rotation motion of the motor 10 into a linear motion and transmits the linear motion to the manual valve 28. The manual valve 28 is provided in a valve body 29. When the manual valve 28 reciprocates in an axial direction, a hydraulic supply path to a hydraulic clutch (not shown) is switched, and an engagement state of the hydraulic clutch is switched. Thereby, the shift range is changed.

On a side of the detent plate 21 close to the detent spring 25, four recess portions 22 for holding the manual valve 28 at positions corresponding to the respective ranges are provided. The recess portions 22 correspond to the respective ranges of D (drive), N (neutral), R (reverse), and P (parking) from a base side of the detent spring 25.

The detent spring 25 is an elastically deformable plate-like member, and a detent roller 26 is provided at a tip of the detent spring 25. The detent roller 26 fits into any of the recess portions 22. The detent spring 25 urges the detent roller 26 toward the center of rotation of the detent plate 21. When a rotation force equal to or more than a predetermined value is applied to the detent plate 21, the detent spring 25 is elastically deformed, and the detent roller 26 moves on the recess portions 22. When the detent roller 26 is fitted into any of the recess portions 22, swinging motion of the detent plate 21 is regulated, an axial position of the manual valve 28 and a state of the parking lock mechanism 30 are determined, and the shift range of an automatic transmission 5 is fixed.

The parking lock mechanism 30 includes a parking rod 31, a conical body 32, a parking lock pawl 33, a shaft portion 34, and a parking gear 35. The parking rod 31 is formed in a substantially L-shape, and one end 311 of the parking rod 31 is fixed to the detent plate 21. The other end 312 of the parking rod 31 is provided with the conical body 32. A diameter of the conical body 32 decreases toward the other end 312. When the detent plate 21 swings in a reverse rotation direction, the conical body 32 moves in a direction P.

The parking lock pawl 33 abuts a conical surface of the conical body 32, and is provided so as to be swingable about the shaft portion 34. A projection portion 331 that can mesh with the parking gear 35 is provided on a side of the parking lock pawl 33 close to the parking gear 35. When the detent plate 21 rotates in the reverse rotation direction and the conical body 32 moves in the direction P, the parking lock pawl 33 is pushed up, and the projection portion 331 and the parking gear 35 mesh with each other. On the other hand, when the detent plate 21 rotates in a forward rotation direction and the conical body 32 moves in a NotP direction, the engagement between the projection portion 331 and the parking gear 35 is released.

The parking gear 35 is provided on an axle (not shown) so as to be engageable with the projection portion 331 of the parking lock pawl 33. When the parking gear 35 and the projection portion 331 are engaged with each other, the rotation of the axle is restricted. When the shift range is a NotP range, the parking gear 35 is not locked by the parking lock pawl 33, and the rotation of the axle is not prevented by the parking lock mechanism 30. When the shift range is the P range, the parking gear 35 is locked by the parking lock pawl 33, and the rotation of the axle is regulated.

Figure 3:
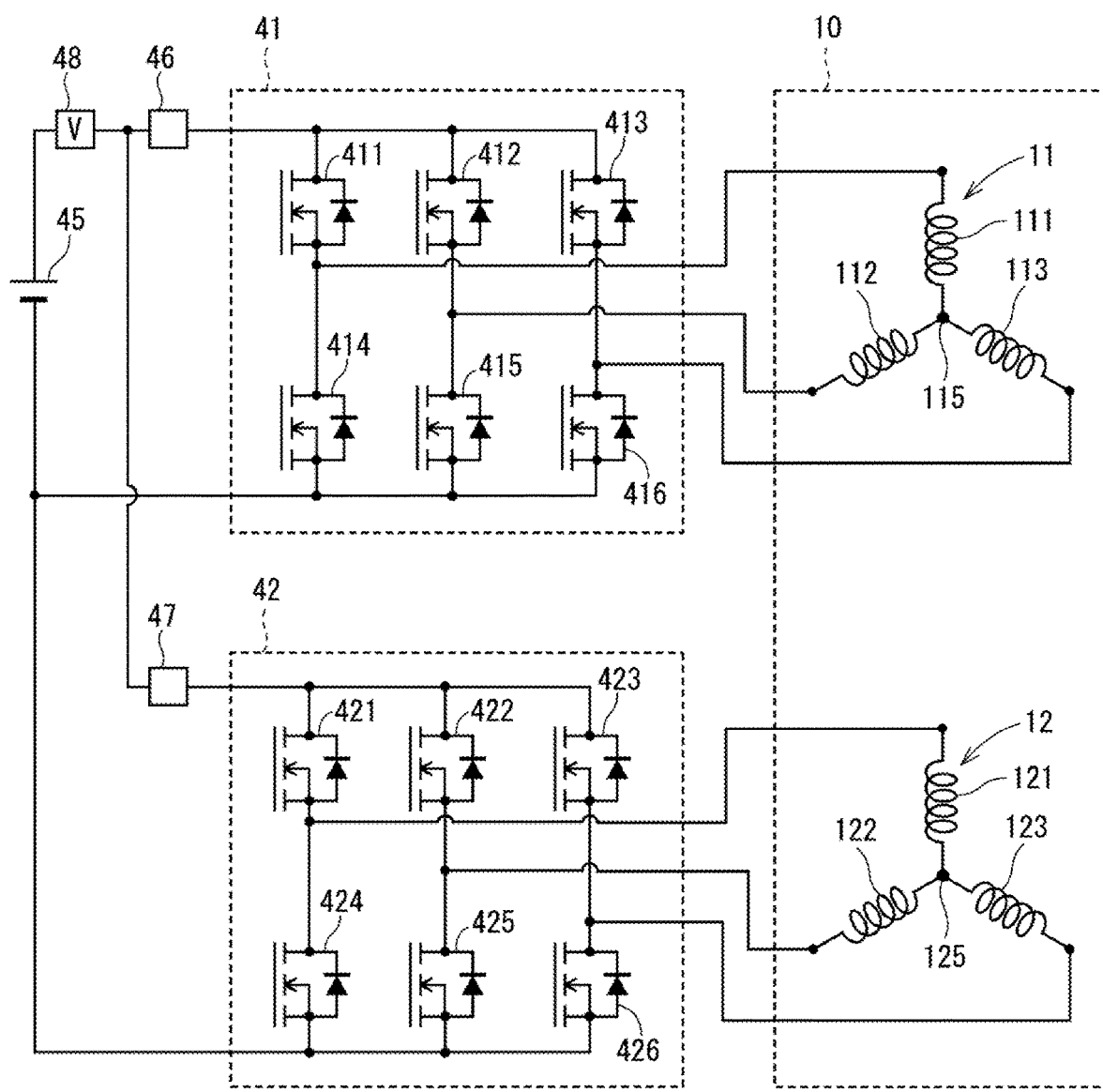
FIG. 3 is a circuit diagram showing a motor and a motor driver according to the first embodiment.
Figure 4:
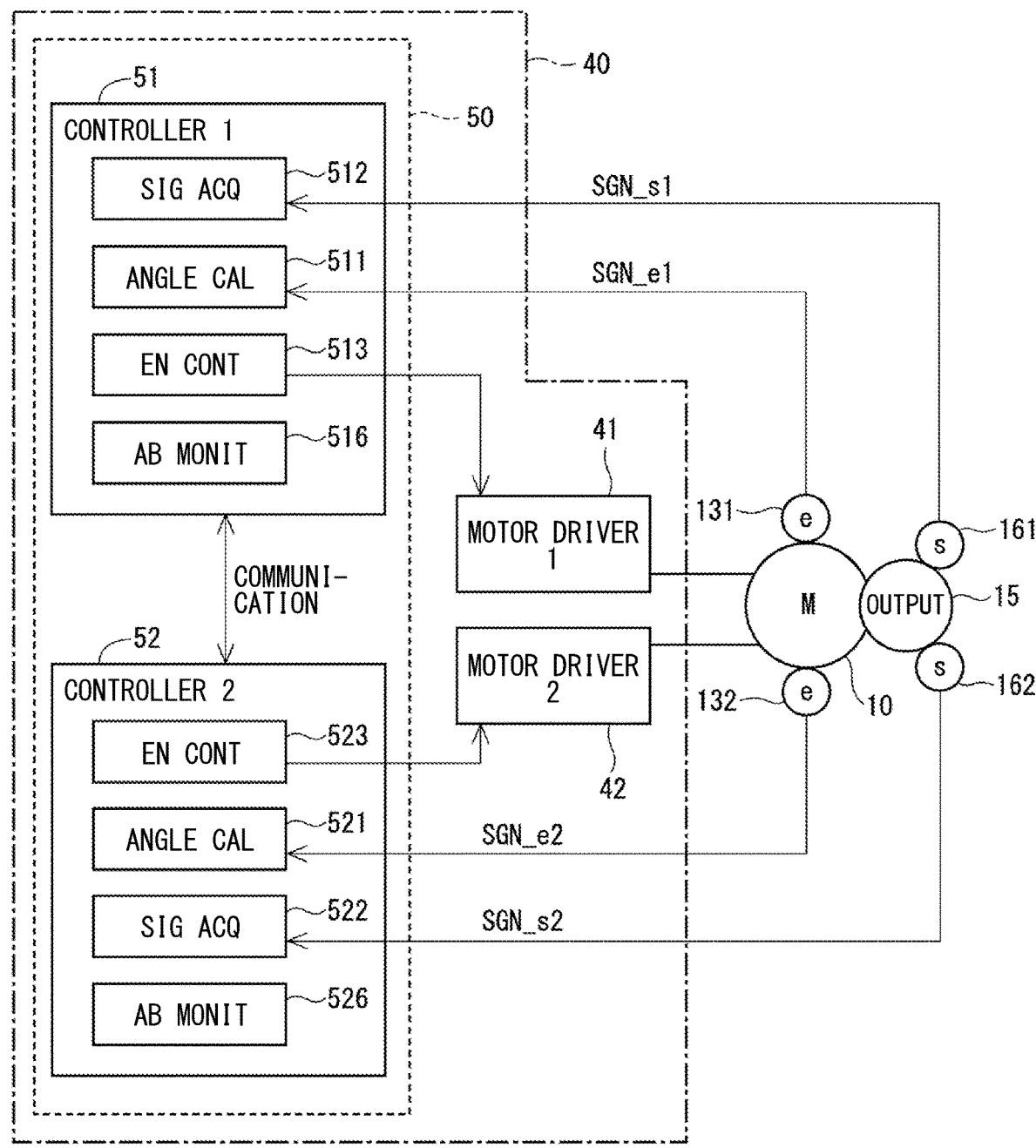
FIG. 4 is a block diagram showing a shift range control device according to the first embodiment.

As shown in FIGS. 2 to 4, the shift range control device 40 includes motor drivers 41 and 42, controllers 51 and 52, and the like. As shown in FIG. 3, the first motor driver 41 is a three-phase inverter for switching the energization of the first motor winding 11, and the switching elements 411 to 416 are bridge-connected to each other. One end of a U1 coil 111 is connected to a connection point of the U-phase switching elements 411 and 414 which are paired with each other. One end of a V1 coil 112 is connected to a connection point of the V-phase switching elements 412 and 415 that are paired with each other. One end of a W1 coil 113 is connected to a connection point of the W-phase switching elements 413 and 416 which are paired with each other. The other ends of the coils 111 to 113 are connected to each other by a connection portion 115.

The second motor driver 42 is a three-phase inverter for switching the energization of the second motor winding 12, and the switching elements 421 to 426 are bridge-connected to each other. One end of the U2 coil 121 is connected to a connection point of the U-phase switching elements 421 and 424 which are paired with each other. One end of the V2 coil 122 is connected to a connection point of the V-phase switching elements 422 and 425 that are paired with each other. One end of the W2 coil 123 is connected to a connection point of the W-phase switching elements 423 and 426 that are paired with each other. The other ends of the coils 121 to 123 are connected to each other by a connection portion 125. The switching elements 411 to 416 and 421 to 426 according to the present embodiment are MOSFETs, but other elements such as IGBTs may be used.

As shown in FIGS. 2 and 3, a first motor relay 46 is provided between the first motor driver 41 and the battery 45, and is capable of switching a state between the battery 45 and the first motor driver 41 to a conduction state or an interruption state. A second motor relay 47 is provided between the second motor driver 42 and the battery 45, and is capable of switching a state between the battery 45 and the second motor driver 42 to the conduction state and the interruption state. A voltage sensor 48 for detecting a battery voltage V is provided on a high potential side of the battery 45.

The ECU 50 controls on-off operations of the switching elements 411 to 416 and 421 to 426, and controls the driving of the motor 10, thereby switching of the shift range is controlled. The ECU 50 controls the driving of a shift hydraulic control solenoid 6 based on a vehicle speed, an accelerator opening degree, a driver requested shift range, and the like. The shift stage is controlled by controlling the shift hydraulic control solenoid 6. The number of the shift hydraulic control solenoids 6 corresponding to the number of transmission stages or the like is provided. In the present embodiment, one ECU 50 controls the driving of the motor 10 and the solenoid 6, but a motor ECU for controlling the motor 10 and an AT-ECU for controlling the solenoid may be separated from each other. Hereinafter, the drive control of the motor 10 will be mainly described.

The ECU 50 has the first controller 51 and the second controller 52. Each of the controllers 51 and 52 includes a CPU, a ROM, a RAM, an I/O (not shown), bus lines for connecting those components, and the like. Each processing in the ECU 50 may be software processing by executing a program stored in advance in a tangible memory device such as a ROM (readable non-transitory tangible recording medium) by a CPU, or may be hardware processing by a dedicated electronic circuit. The controllers 51 and 52 are configured to communicate with each other by an inter-microcomputer communication or the like, and transmit and receive information to and from each other. In addition, the controllers 51 and 52 acquire a switching request for instructing switching of the shift range from an external controller (not shown) by a communication.

Hereinafter, a combination of the first motor winding 11 and the first controller 51 or the like related to the energization control of the first motor winding 11 will be referred to as a first system. In addition, a combination of the second motor winding 12, and the second controller 52 or the like related to the energization control of the second motor winding 12, will be referred to as a second system. Hereinafter, a subscript "1" is applied to the configuration and value of the first system, and a subscript "2" is applied to the value of the second system, as appropriate.

The first controller 51 includes an angle calculation unit 511, a signal acquisition unit 512, an energization control unit 513, an abnormality monitoring unit 516, and the like. The angle calculation unit 511 acquires an encoder signal SGN_e1 output from the first encoder 131, counts pulse edges of the encoder signal SGN_e1, and calculates an encoder count value θen1. The signal acquisition unit 512 acquires an output shaft signal SGN_s1 from the output shaft sensor 161, and calculates an output shaft angle θ_s1. The angle calculation unit 511 may be also referred to as "ANGLE CAL" in the drawings. The signal acquisition unit 512 may be also referred to as "SIG ACO" in the drawings. The energization control unit 513 may be also referred to as "EN CONT" in the drawings. The abnormality monitoring unit 516 may be also referred to as "AB MONIT" in the drawings.

The energization control unit 513 controls energization of the motor winding 11. Specifically, the energization control unit 513 generates a control signal for controlling the on-off operation of the switching elements 411 to 416 of the first motor driver 41, and outputs the control signal to the first motor driver 41. The energization control unit 513 controls driving of the motor 10 by a feedback control or the like so that the encoder count value θen1 reaches a target count value θcmd1 set according to the target shift range. The abnormality monitoring unit 516 monitors an abnormality in the first system.

The second controller 52 includes an angle calculation unit 521, a signal acquisition unit 522, an energization control unit 523, an abnormality monitoring unit 526, and the like. The angle calculation unit 521 counts pulse edges of each phase of an encoder signal SGN_e2 output from the encoder 132, and calculates an encoder count value θen2. The signal acquisition unit 522 acquires an output shaft signal SGN_s2 from the output shaft sensor 162. The angle calculation unit 521 may be also referred to as "ANGLE CAL" in the drawings. The signal acquisition unit 522 may be also referred to as "SIG ACO" in the drawings. The energization control unit 523 may be also referred to as "EN CONT" in the drawings. The abnormality monitoring unit 526 may be also referred to as "AB MONIT" in the drawings.

The energization control unit 523 controls energization of the motor winding 12. Specifically, the energization control unit 523 generates a control signal for controlling the on-off operation of the switching elements 421 to 426 of the second motor driver 42, and outputs the control signal to the second motor driver 42. The energization control unit 523 controls the driving of the motor 10 by a feedback control or the like so that the encoder count value θen2 reaches a target count value θcmd2 set according to the target shift range. The abnormality monitoring unit 526 monitors an abnormality in the second system.

Figure 5:
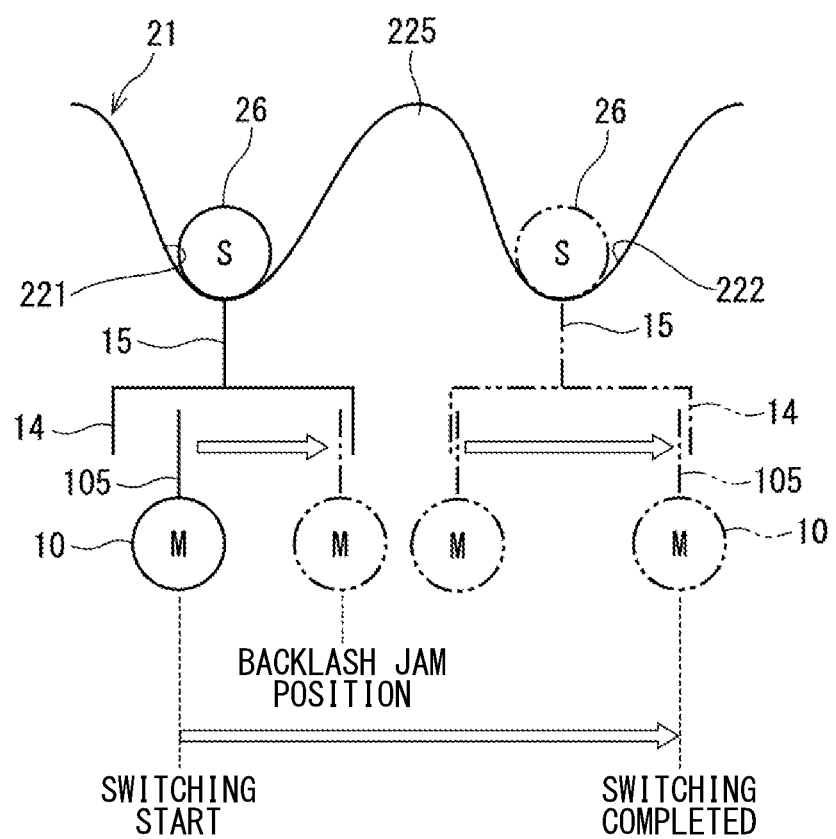
FIG. 5 is a schematic diagram illustrating a relationship among a motor shaft, an output shaft, and a detent plate according to the first embodiment.

FIG. 5 shows a relationship among the motor shaft 105, which is a rotation shaft of the motor 10, the output shaft 15, and the detent plate 21. FIG. 5 schematically shows a state in which the motor 10 rotates from a state shown by a solid line to a state shown by a two-dot chain line, so that the detent roller 26 fits into the recess portion 22 corresponding to the driver requested shift range. In this example, a recess portion corresponding to the P range is defined as a recess portion 221, a recess portion corresponding to the R range is defined as a recess portion 222, and the recess portions 221 and 222 are separated by a crest portion 225.

FIG. 5 shows a state in which the rotation directions of the motor 10 and the output shaft 15 are left and right directions in a paper surface, and the detent roller 26 is moved from the recess portion 221 to the recess portion 222 in order to switch the shift range from the P range to the R range. Actually, the detent roller 26 moves in the recess portion 22 by the rotation of the detent plate 21, but in FIG. 5, the detent roller 26 is merely illustrated as moving. In addition, FIG. 5 is a schematic diagram conceptually showing "play", in which the output shaft 15 and the speed reducer 14 are integrated together, and the motor shaft 105 is described as being movable within the play range of the speed reducer 14. Alternatively, the motor shaft 105 and the speed reducer 14 are integrated together, and the "play" may exist between the speed reducer 14 and the output shaft 15.

The speed reducer 14 is provided between the motor shaft 105 and the output shaft 15, and "play" including a gear backlash exists between the motor shaft 105 and the output shaft 15. When the motor 10 rotates while the motor shaft 105 and the speed reducer 14 are separated from each other in the rotation direction, the motor 10 becomes idle until the motor shaft 105 and the speed reducer 14 abut against each other, and the rotation of the motor 10 is not transmitted towards the output shaft 15. Hereinafter, a state in which the rotation of the motor 10 is not transmitted to the output shaft 15 within the play range is referred to as a "backlash idling state", and a state in which the motor shaft 105 and the speed reducer 14 abut against each other and the backlash idling state is terminated is referred to as a "backlash clogging".

When the backlash idling is completed, the motor 10, the output shaft 15, and the detent plate 21 rotate together. As a result, the detent roller 26 goes over the crest portion 225 between the concave portions 221 and 222 and moves to the recess portion 222. When the detent roller 26 exceeds a peak of the crest portion 225, the output shaft 15 precedes by an urging force of the detent spring 25, and when the detent roller 26 fits into the recess portion 222, the motor 10 stops within the backlash.

In the present embodiment, the two controllers 51 and 52 control the driving of one motor 10. In the present embodiment, the controllers 51 and 52 acquire a shift range switching request from an external controller (not shown), and start driving the motor 10. In this example, when an acquisition timing of the shift range switching request is deviated in the controllers 51 and 52 due to a communication delay or the like, a drive start timing of the motor 10 is deviated, and a mismatch may occur in the drive control of the motor 10 such that, for example, one of the controllers 51 and 52 attempts to accelerate the motor 10 and the other attempts to decelerate the motor 10.

Therefore, in the present embodiment, in a case where the shift range switching request is acquired, when the other system is being driven based on the information acquired in the communication, the driving in the host system is cancelled. In the present embodiment, when the drive mode is a standby mode, the motor 10 has not started the range switching and is being stopped. When the drive mode is the feedback mode and a stop mode, the range switching is started. The drive mode of the system in which the drive control of the motor 10 is not performed due to an abnormality is set as the standby mode.

A drive control process according to the present embodiment will be described with reference to a flowchart of FIG. 6. This process is executed in a predetermined cycle when a start switch of the vehicle, which is an ignition switch or the like, is turned on. Hereinafter, a "Step" of Step S101 may be omitted, and simply referred to as the symbol "S". The similar applies to the other steps. In the drawing, the feedback is referred to as "F/B".

In S101, the controller 51 and 52 determine the drive mode. When the drive mode is the standby mode, the process proceeds to S102. When the drive mode is the feedback mode, the process proceeds to S105. When the drive mode is the stop mode, the process proceeds to S107.

In S102 to which the process proceeds to when the drive mode is the feedback mode, the controllers 51 and 52 determine whether the target range has been changed. When it is determined that the target range has not been changed (NO in S102), the standby mode is continued. When it is determined that the target range has been changed (YES in S102), the process proceeds to S103.

In S103, the controllers 51 and 52 determine whether the drive mode of the other system is the standby mode. In the case of three or more systems, an affirmative determination is made when the drive modes of all the systems are the standby mode, and a negative determination is made when at least one system is a mode other than the standby mode and the motor 10 starts driving. The similar applies to S202 of the second embodiment. When it is determined that the drive mode of the other system is not the standby mode (NO in S103), that is, when the range switching is started in the other system, the standby mode is continued. When it is determined that the drive mode of the other system is the standby mode (YES in S103), the process proceeds to S104 and the drive mode is switched to the feedback mode.

In S105 to which the process proceeds when the drive mode is the feedback mode, the controllers 51 and 52 determine whether the rotation position of the motor 10 has reached a target angle. In the present embodiment, when encoder count values $\theta en1$ and $\theta en2$ fall within a predetermined range including target count values $\theta cmd1$ and $\theta cmd2$ (for example, ±2 counts), it is determined that the rotation position of the motor 10 has reached the target angle. When it is determined that the rotation position of the motor 10 has not reached the target angle (NO in S105), the feedback mode is continued. When it is determined that the rotation position of the motor 10 has reached the target angle position (YES in S105), the process proceeds to S106, and the drive mode is switched to the stopping mode. In the stop mode, the motor 10 is stopped by the stationary phase energization to the two phases in accordance with the encoder count values $\theta en1$ and $\theta en2$.

In S107 to which the process proceeds when the drive mode is the stop mode, it is determined whether the stationary phase energization is completed after the stationary phase energization has been started and a stationary phase energization duration has elapsed. The stationary phase energization duration is set in accordance with a time required to stop the motor 10. When it is determined that the stationary phase energization is not completed (NO in S107), the stop mode is continued. When it is determined that the stationary phase energization is completed (YES S107), the process proceeds to S108, and the drive mode is switched to the standby mode.

Figure 7:
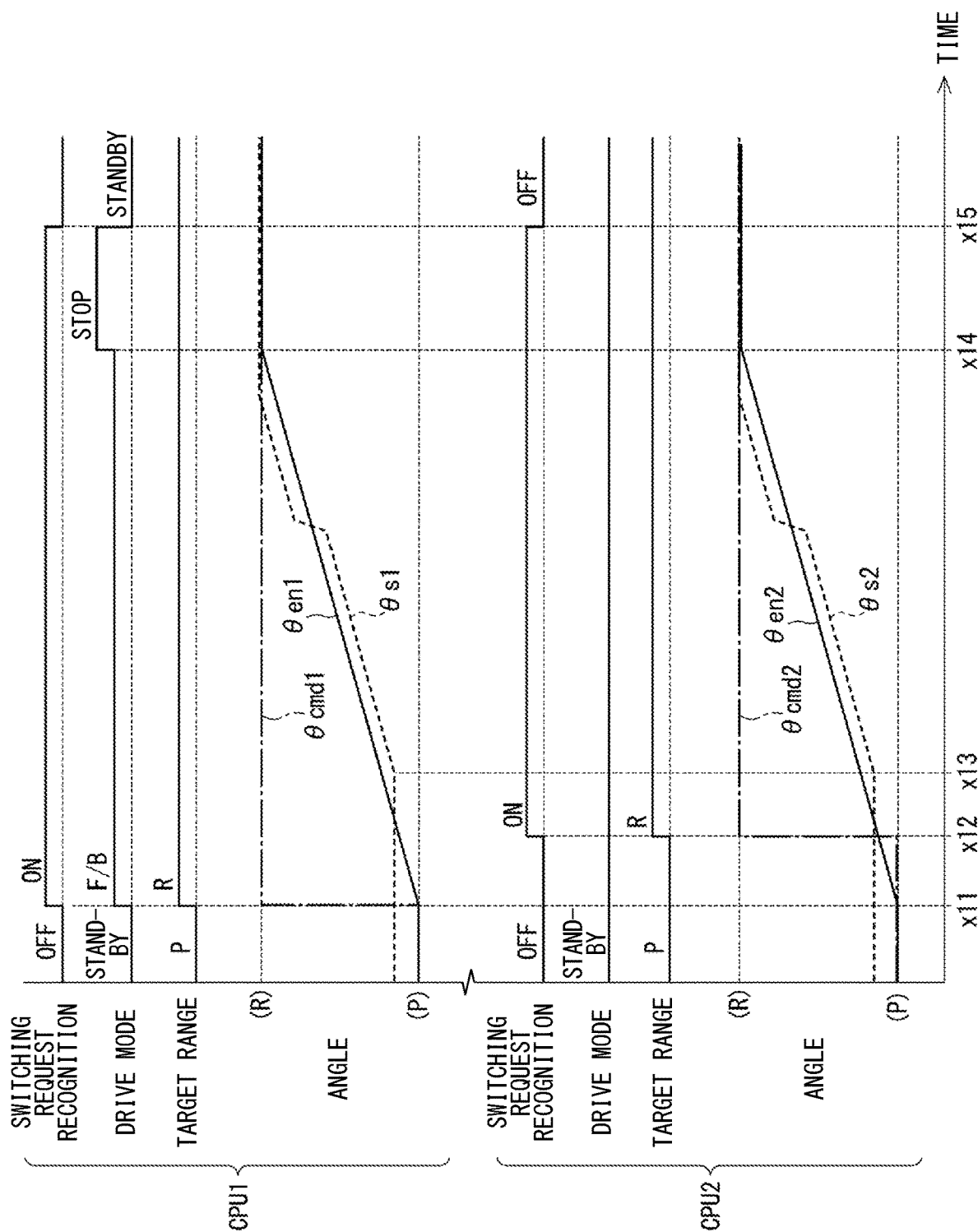
FIG. 7 is a time chart illustrating a drive control process according to the first embodiment.

The drive control process according to the present embodiment will be described with reference to a time chart of FIG. 7. In FIG. 7, the first system is shown in an upper side, and the second system is shown in a lower side. In the drawing, the processing of the first system is referred to as "CPU1" and the processing of the second system is referred to as "CPU 2". In each system, switching request recognition, the drive mode, the target range, and the angles of the motor and the output shaft are shown from the top. The motor angles are described as the encoder count values $\theta en1$ and $\theta en2$, and output shaft angles $\theta s1$ and $\theta s2$ are described as values converted into the encoder count values. In addition, ranges are described in parentheses at values corresponding to the P range and the R range. The substantially similar applies to the drawings related to embodiments to be described later.

In the first controller 51, at a time x11, the switching request is recognized, the switching request is turned on, and the target range is changed. In this example, the target range is changed from the P range to the R range. When the switching request is turned on, the drive mode is changed from the standby mode to the feedback mode, and the driving of the motor 10 is started. When the backlash idling is completed at a time x13, the output shaft 15 is driven. When the detent roller 26 moves over the crest portion 225 during the feedback control, the output shaft 15 is advanced by the urging force of the detent spring 25.

At a time x14, when the motor 10 reaches the target position, the drive mode is switched from the feedback mode to the stop mode, and the motor 10 is stopped by the stationary phase energization. The drive mode is switched from the stop mode to the standby mode at a time x15 when the stationary phase energization duration has elapsed from time the x14.

At a time x12, the second controller 52 recognizes the switching request. At this time, since the driving of the motor 10 has already started in the first system, the second controller 52 holds the standby. In other words, the drive control of the motor 10 is cancelled. Since the motor 10 is driven by the first system, the encoder count value θen2 of the second system changes in the similar manner to the encoder count value θen1 of the first system. Similarly, the output shaft angle θs2 of the second system changes in the similar manner to the output shaft angle θs1 of the first system. In the second controller 52, since the standby mode is continued at the time x12, the target count value θcmd2 may not be set, but is described in this example for better understanding.

In the present embodiment, the information on the drive control of the motor 10 is shared among the systems, and when the drive of the motor 10 is started in one system due to the deviation of the switching request recognition timing, the other system does not perform the drive control of the motor 10 and maintains the standby. In this case, the motor 10 is driven by one system. As a result, the motor 10 can be appropriately driven without preventing the driving of the motor 10 between the systems.

As described above, the shift range control device 40 according to the present embodiment switches the shift range by controlling the driving of the motor 10, and includes the multiple controllers 51 and 52 that can communicate with each other and control the driving of the motor 10. The controllers 51 and 52 share control information related to drive control of the motor 10. When the control information is different from each other, one of the controllers 51 and 52 is set as the continuation controller, and the other is set as the stop controller, and the driving of the motor 10 by the stop controller is stopped, and the driving of the motor 10 is continued by the continuation controller. In other words, for example, when the control information is different between the two controllers 51 and 52, the motor 10 is driven by one controller and the motor 10 is stopped by the other controller. As a result, when one motor 10 is controlled by the multiple controllers, a control mismatch due to an inconsistency of the control information can be prevented.

The control information according to the present embodiment is a drive mode as "drive state information related to the drive state of the motor". When the controllers 51 and 52 recognize the range switching request, if the motor 10 is being driven by another controller, the other controller is set as the continuation controller, and the host controller is set as the stop controller so that the drive control of the motor 10 is not started, and the stop is continued. Thereby, it may be possible to prevent the mismatch of the driving of the motor 10 due to the deviation of the recognition timing of the range switching request.

Second Embodiment

Figure 8:
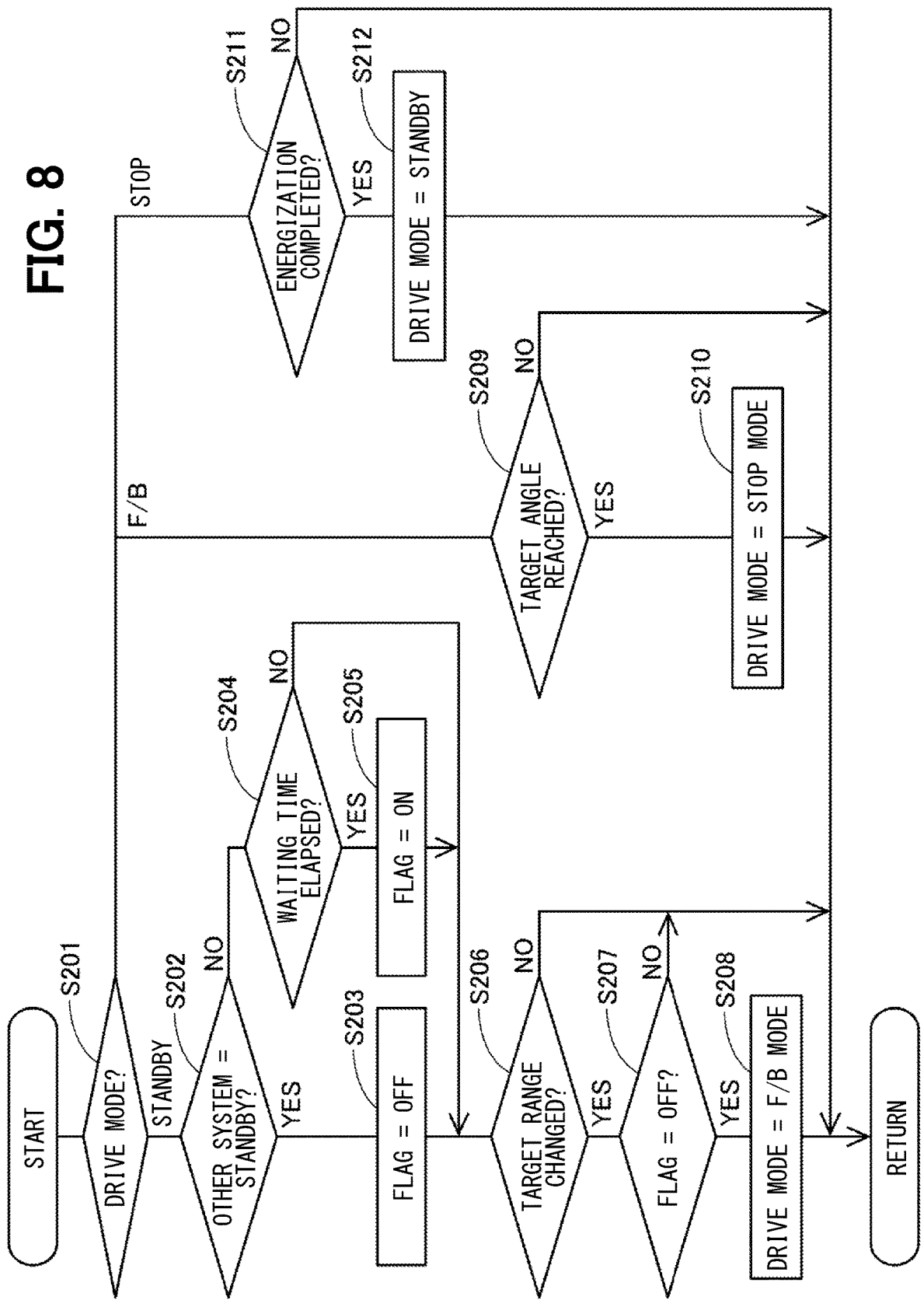
FIG. 8 is a flowchart illustrating a drive control process according to a second embodiment.
Figure 9:
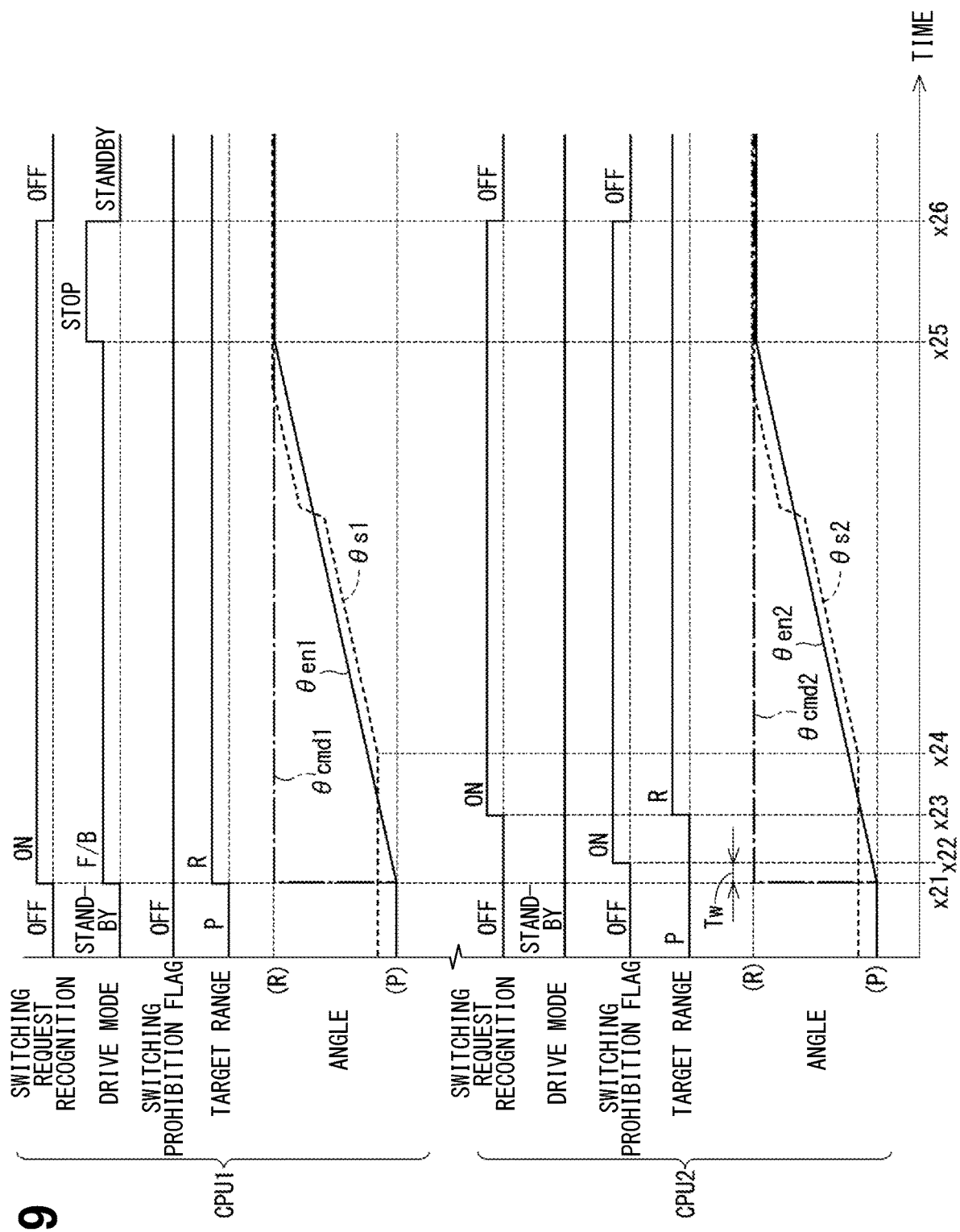
FIG. 9 is a time chart illustrating the drive control process according to the second embodiment.

A second embodiment is shown in FIGS. 8 and 9. In the present embodiment, since a drive control process is different from that in the above embodiment, the drive control process will be mainly described. The drive control process according to the present embodiment will be described with reference to a flowchart of FIG. 8.

Figure 6:
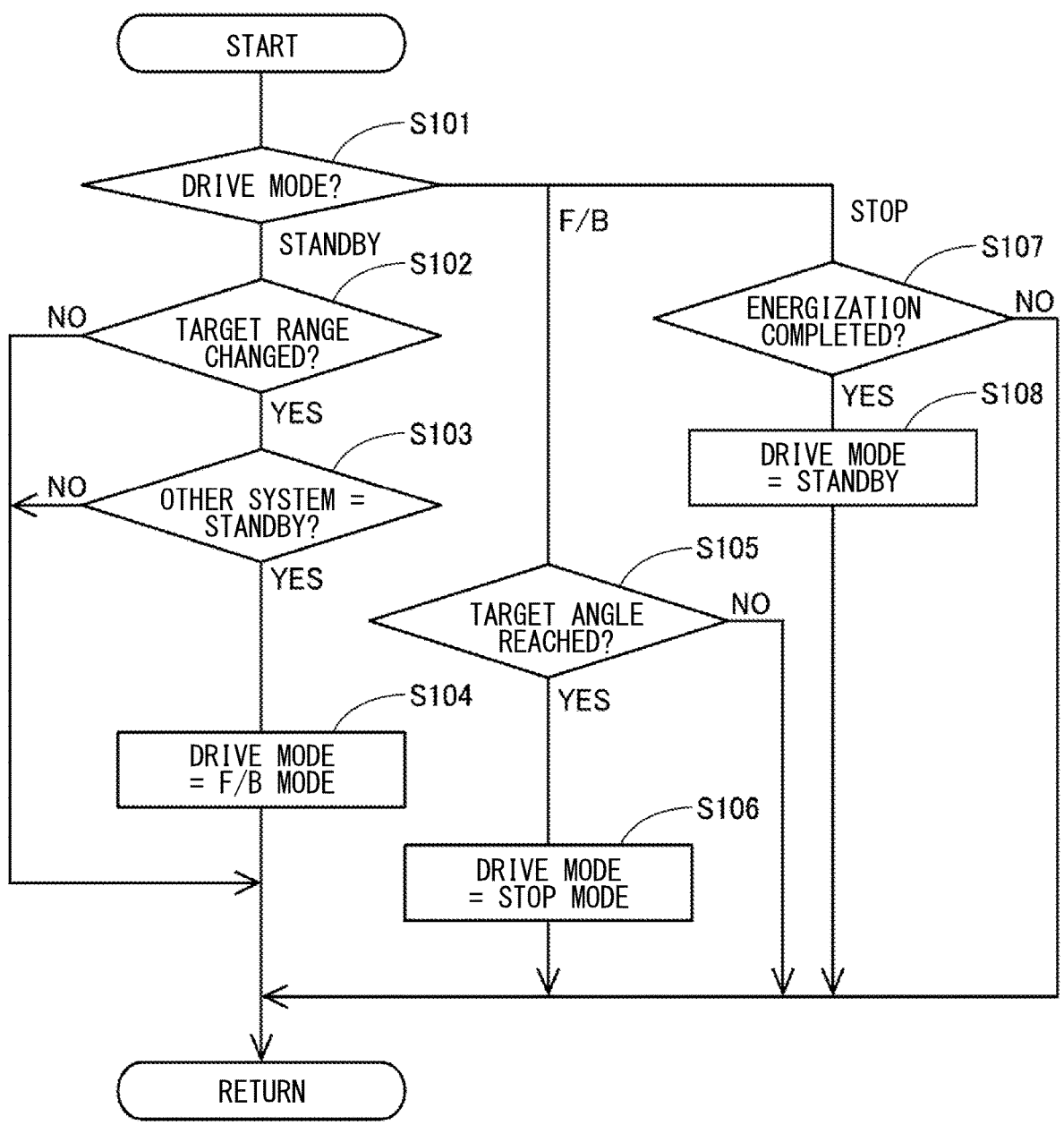
FIG. 6 is a flowchart illustrating a drive control process according to the first embodiment.

The process of S201 is similar to the process of S101 in FIG. 6, and when the drive mode is the standby mode, the process proceeds to S202. When the drive mode is the feedback mode, the process proceeds to S209, and when the drive mode is the stop mode, the process proceeds to S211.

In S202, the controllers 51 and 52 determine whether the drive mode of the other system is the standby mode. When it is determined that the other system is in the standby mode (YES in S202), the process proceeds to S203 and a switching prohibition flag is turned off. When the switching prohibition flag is off, an off state continues. When it is determined that the drive mode of the other system is not the standby mode (NO in S202), that is, when the driving of the motor 10 is started in the other system, the process proceeds to S204.

In S204, the controllers 51 and 52 determine whether a determination waiting time Tw has elapsed. The determination waiting time Tw is set to a time at which a mismatch caused by a deviation in the control timing between the systems does not occur. When it is determined that the determination waiting time Tw has not elapsed (NO in S204), the process of S205 is not executed, and the switching prohibition flag is kept off. When it is determined that the determination waiting time Tw has elapsed (YES in S204), the process proceeds to S205, and the switching prohibition flag is turned on.

The process of S206 is similar to the process of S102 in FIG. 6, and when it is determined that the target range has not been changed (NO in S206), the standby mode is continued, and when it is determined that the target range has been changed (YES in S206), the process proceeds to S207.

In S207, the controllers 51 and 52 determine whether the switching prohibition flag is off. When it is determined that the switching prohibition flag is off (YES in S207), the process proceeds to S208, and the drive mode is switched to the feedback mode. When it is determined that the switching prohibition flag is on (NO in S207), the standby mode is continued without executing the process of S208. The processes of S209 to S212 are similar to the processes of S105 to S108 in FIG. 6.

The drive control process according to the present embodiment will be described with reference to a time chart of FIG. 9. The operation of the first system is similar to that of the first embodiment, the process at a time x21 is similar to the process at the time x11 in FIG. 7, and the process at times x23 to x26 is similar to the process at the times x12 to x15 in FIG. 7.

In the second controller 52, when the first system is switched from the standby mode to the feedback mode at the time x21, counting is started. When the determination waiting time Tw elapses at the time x22, the switching prohibition flag is turned on. At the time x23, the switching request of the second controller 52 is turned on. At this time, since the switching prohibition flag is on, the standby is held, and the motor 10 is driven in the first system. The switching prohibition flag is turned on at a stage when the determination waiting time Tw has elapsed, it can be determined whether the switching is enabled in advance before recognizing the switching request. Further, at the time x26, the drive mode of the first system switches from the stop mode to the standby mode, and when the range switching is completed, the switching prohibition flag returns to off.

Although illustration is omitted, when the second controller 52 recognizes the range switching request during a period from the time x21 at which the first system is switched to the feedback mode to the elapse of the determination waiting time Tw, the drive mode is switched from the standby mode to the feedback mode to drive the motor 10. In that case, the motor 10 is driven by the first system and the second system.

In the present embodiment, the determination delay is provided for the switching request recognition, and when the switch request is recognized within the determination waiting time Tw, the mode shifts to the feedback mode. As a result, when the deviation in the switching request recognition between the systems falls within the determination waiting time Tw, the motor 10 using the two systems can be driven. When the deviation of the switching request recognition is larger than the determination waiting time Tw, the motor 10 is driven in the system that first recognizes the switching request, and the drive control in the system that recognizes the switching request later is stopped, so that the motor 10 can be appropriately driven without preventing the system that first starts the driving of the motor 10.

In the present embodiment, the drive control of the motor 10 is performed by all the controllers 51 and 52 when an inconsistency can be resolved or the inconsistency has been resolved within the determination waiting time Tw after the inconsistency of the control information has been detected, and the drive control of the motor 10 is stopped by the stop controller when the inconsistency of the control information continues over the determination waiting time Tw. The control information according to the present embodiment is the drive mode similarly to the first embodiment, but may be information other than the drive mode to be described in a third embodiment. In this example, when the switching request is recognized by the second controller 52 within the determination waiting time Tw after the first controller 51 switches to the feedback mode, the drive mode can be switched to the feedback mode, and therefore, it may be considered that "the inconsistency can be resolved within the determination waiting time after the inconsistency of the control information is detected". As a result, a timing deviation within the determination waiting time Tw is allowed. In addition, the second controller 52 can determine whether the switching is enabled in advance at a stage before the switching request recognition is switched.

Third Embodiment

A third embodiment is shown in FIGS. 10 to 17. In the above embodiments, when the recognition timing of the switching request deviates from each other, a motor 10 is driven by use of the system that has first recognized the switching request. In the present embodiment, when information differs between the systems, the first system is preferentially used to drive the motor 10. The recognition timing of the switching request may be similar to that in the above embodiments.

Figure 10:
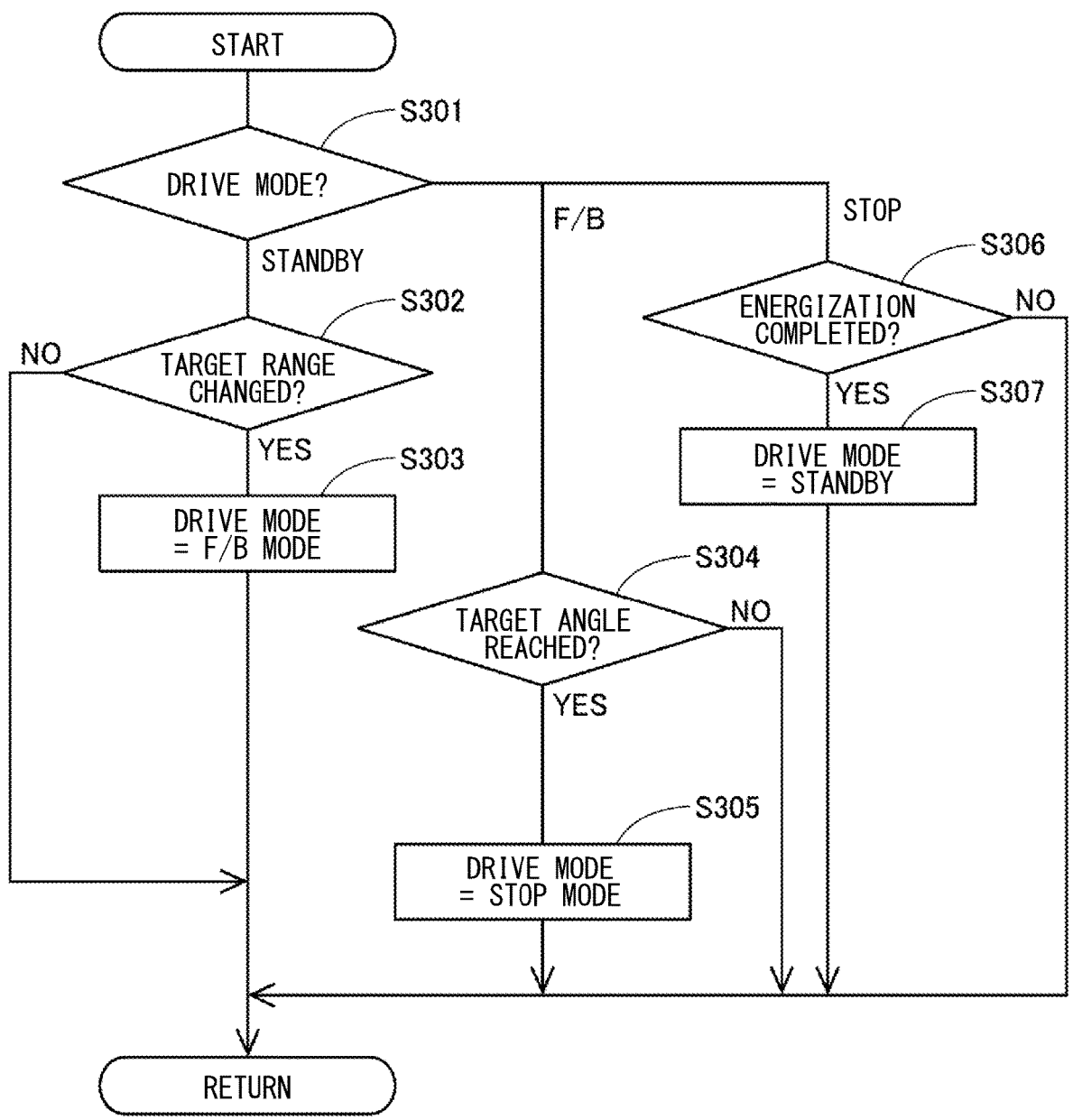
FIG. 10 is a flowchart illustrating a drive control process in a first controller according to a third embodiment.
Figure 11:
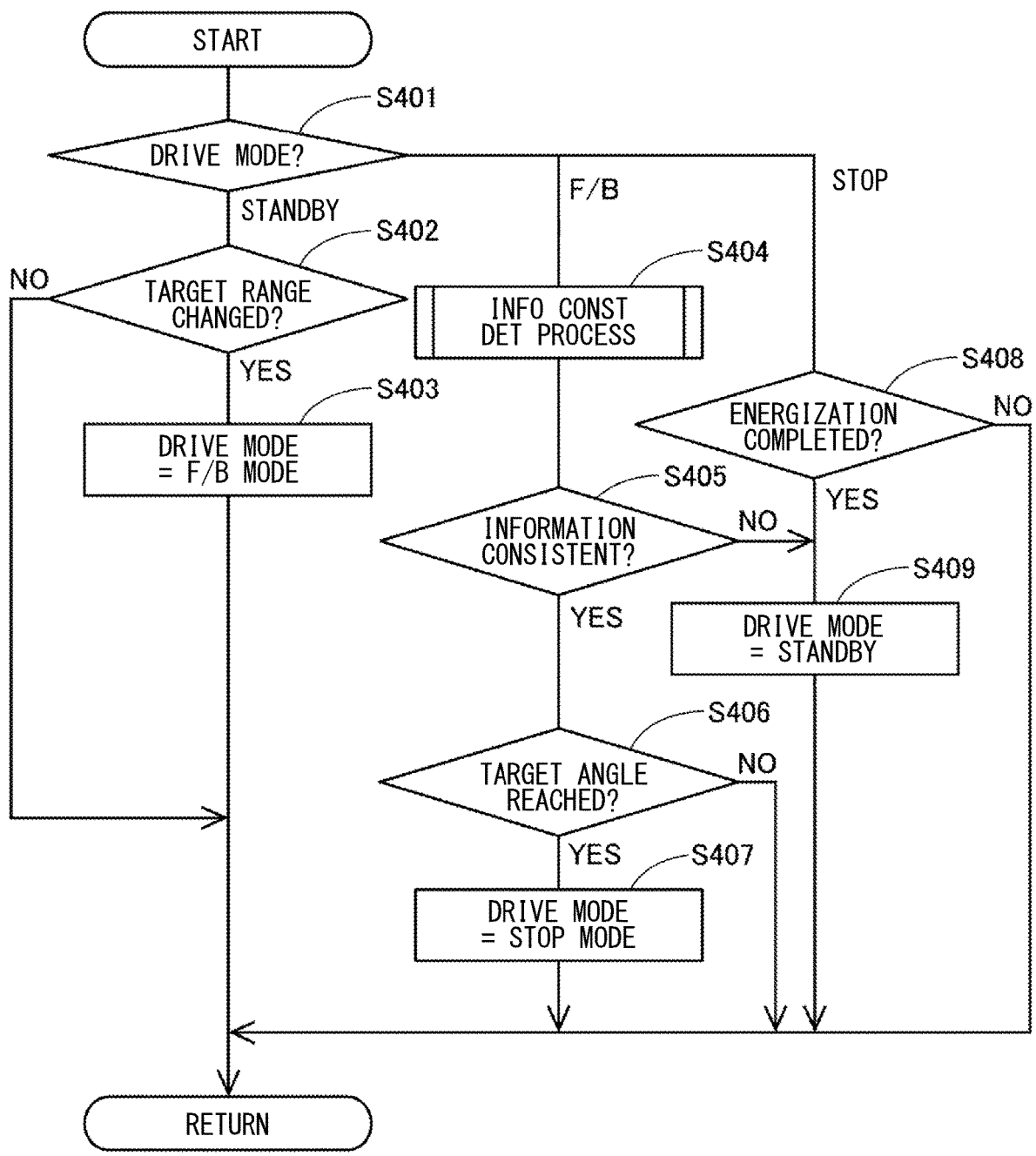
FIG. 11 is a flowchart illustrating a drive control process in a second controller according to the third embodiment.
Figure 12:
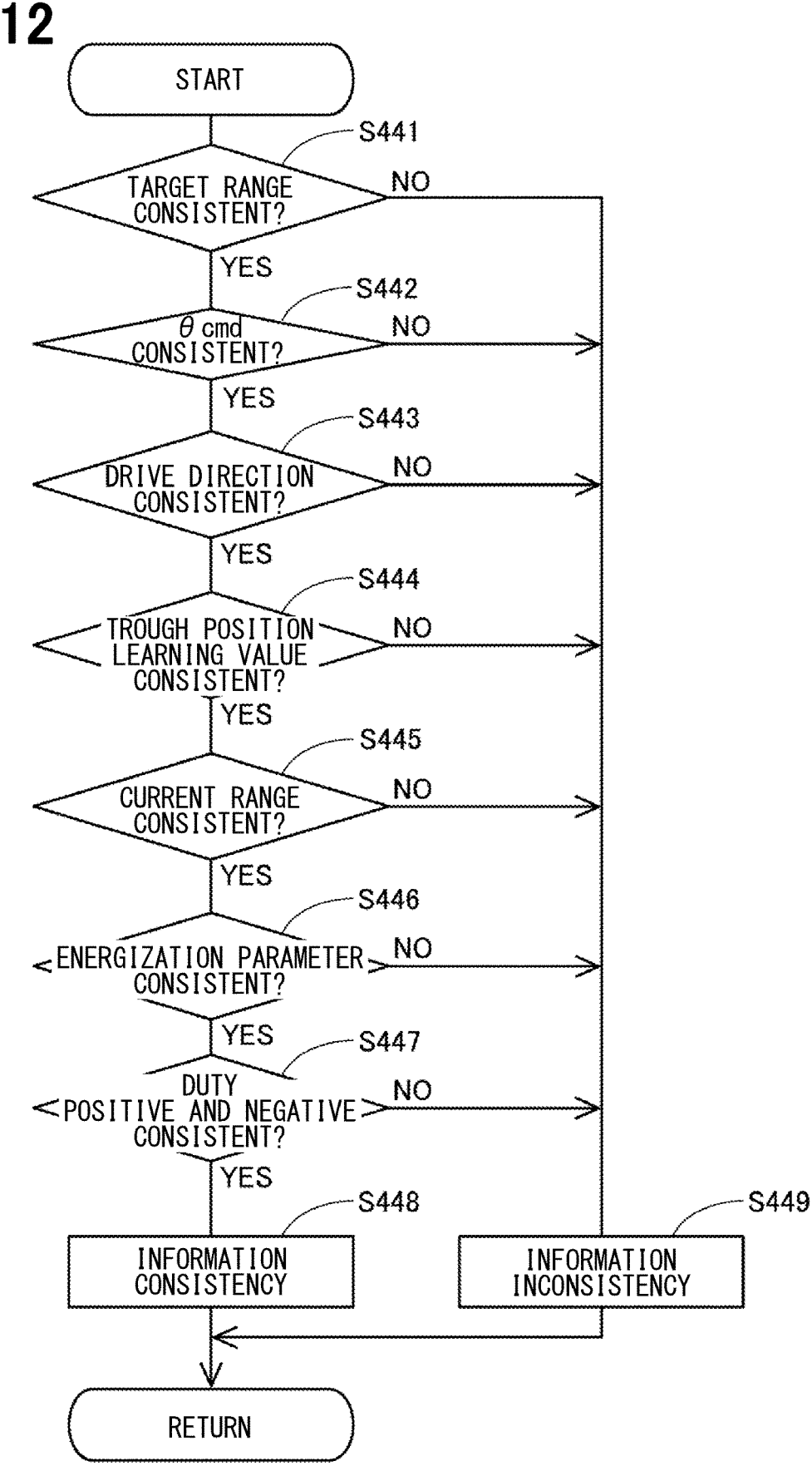
FIG. 12 is a flowchart illustrating an information consistency determination process according to the third embodiment.

The drive control process according to the present embodiment will be described with reference to flowcharts of FIGS. 10 to 12. FIG. 10 shows processes in a first controller 51, and FIG. 11 and FIG. 12 show processes in a second controller 52. The process of S301 in FIG. 10 is similar to the process of S101 in FIG. 6, and the process proceeds to S302 when the drive mode is the standby mode, proceeds to S304 when the drive mode is the feedback mode, and proceeds to S306 when the drive mode is the stop mode.

The process of S302 is similar to the process of S102 in FIG. 6, and when it is determined that the target range has been changed, the process proceeds to S303, and the drive mode is switched to the feedback mode. The processes of S304 to S307 are similar to the processes of S105 to S108 in FIG. 6.

The drive control process in the second controller 52 is shown in FIGS. 11 and 12. The process of S401 in FIG. 11 is similar to that of S101 in FIG. 6, and the process proceeds to S402 when the drive mode is the standby mode, proceeds to S404 when the drive mode is the feedback mode, and proceeds to S408 when the drive mode is the stop mode. The process of S402 is similar to the process of S102 in FIG. 6, and when it is determined that the target range has been changed, the process proceeds to S403, and the drive mode is switched to the feedback mode.

In S404 to which the process proceeds when the drive mode is the feedback mode, an information consistency determination process is executed. FIG. 12 shows a sub-flow of the information consistency determination process. The order of the processes of S441 to S447 in FIG. 12 may be changed. Further, in the processes of S441 to S447, as shown in the second embodiment, any determination delay time may be provided from a time when the consistency is detected to a time when the determination is made. The determination delay time may be the same or different in each process. In addition, a part of the processes of S441 to S447 may be omitted. The information consistency determination process may be also referred to as "INFO CONST DET PROCESS" in the drawings.

In S441, the second controller 52 determines whether the target range of the host system coincides with the target range of the other system. When it is determined that the target ranges do not coincide with each other (NO in S441), the process proceeds to S449, and when it is determined that the target ranges coincide with each other (YES in S441), the process proceeds to S442.

In S442, the second controller 52 determines whether a target count value $\theta cmd2$ of the host system coincides with a target count value $\theta cmd1$ of the other system. In this example, when an absolute value of a difference between the target count values $\theta cmd1$ and $\theta cmd2$ is equal to or less than a target count consistency determination value $\theta cmd\_th$, it is determined that the target count values $\theta cmd1$ and $\theta cmd2$ coincide with each other. When it is determined that the target count values $\theta cmd1$ and $\theta cmd2$ do not coincide with each other (NO in S442), the process proceeds to S449, and when it is determined that the target count values $\theta cmd1$ and $\theta cmd2$ coincide with each other (YES in S442), the process proceeds to S443.

In S443, the second controller 52 determines whether a drive direction for driving the motor 10 in the host system coincides with a drive direction of the other system. When it is determined that the drive direction does not coincide with that in the other system (NO in S443), the process proceeds to S449, and when it is determined that the drive direction coincides with that in the other system (YES in S443), the process proceeds to S444.

In S444, the second controller 52 determines whether a bottom (valley) position learning value held in the host system coincides with a bottom position learning value of the other system. The bottom position learning value is an encoder count value when the detent roller 26 fits in the recess portion 22 corresponding to each range. In this example, in the case where an error of the bottom position learning value between the systems is equal to or less than a bottom position learning value consistency determination value for each range, it is determined that the bottom position learning values coincide with each other. When it is determined that the bottom position learning values do not coincide with each other (NO in S444), the process proceeds to S449, and when it is determined that the bottom position learning values coincide with each other (YES in S444), the process proceeds to S445.

In S445, the second controller 52 determines whether the current range of the host system coincides with that of the other system. When it is determined that the current ranges do not coincide with each other (NO in S445), the process proceeds to S449, and when it is determined that the current ranges coincide with each other (YES in S445), the process proceeds to S446.

In S446, the second controller 52 determines whether energization parameters, which are parameters related to the energization control of the motor 10, coincide with each other. The energization parameter is a value used for drive control of the motor 10, and is, for example, a voltage, a temperature, a target rotation speed, a detected current, a torque command value, or the like. In this example, a consistency determination value is set for each parameter to be determined, and when the error between the systems is equal to or less than the consistency determination value, it is determined that the energization parameters coincide with each other. When it is determined that the energization parameters do not coincide with each other (NO in S446), the process proceeds to S449, and when it is determined that the energization parameters coincide with each other (YES in S446), the process proceeds to S447.

In S447, the second controller 52 determines whether the positive and negative of an energization duty command values coincide with each other. The energization duty command value for controlling the on-off operation of the switching elements 411 to 416 and 421 to 426, and an absolute value is a ratio of an on-time, and an acceleration time is defined as positive, and a deceleration time is defined as negative. When it is determined that the positive and negative of the energization duty command value do not coincide with each other (NO in S447), the process proceeds to S449, and when it is determined that the positive and negative of the energization duty command value coincide with each other (YES in S447), the process proceeds to S448.

In S448, the second controller 52 determines that the information used for the drive control of the motor 10 coincides with the information of the other system. In S449 to which the process proceeds when the determination is negative in any of S441 to S447, the second controller 52 determines that at least a part of the information used for the drive control of the motor 10 does not coincide with that in the other system.

Returning to FIG. 11, in S405 to which process proceeds after the information consistency determination process is completed, the second controller 52 determines whether the information of the host system coincides with the information of the other system. When it is determined that the information of the host system does not coincide with the information of the other system (NO in S405), the process proceeds to S409, and the drive mode is switched to the standby mode. In other words, when at least a part of the information related to the drive control of the motor 10 does not coincide with that in the first system, the drive control of the motor 10 in the second system is cancelled. When it is determined that the information of the host system coincides with the information of the other system (YES in S405), the process proceeds to S406. The processes of S406 to S409 are similar to the processes of S105 to S108 in FIG. 6.

Figure 13:
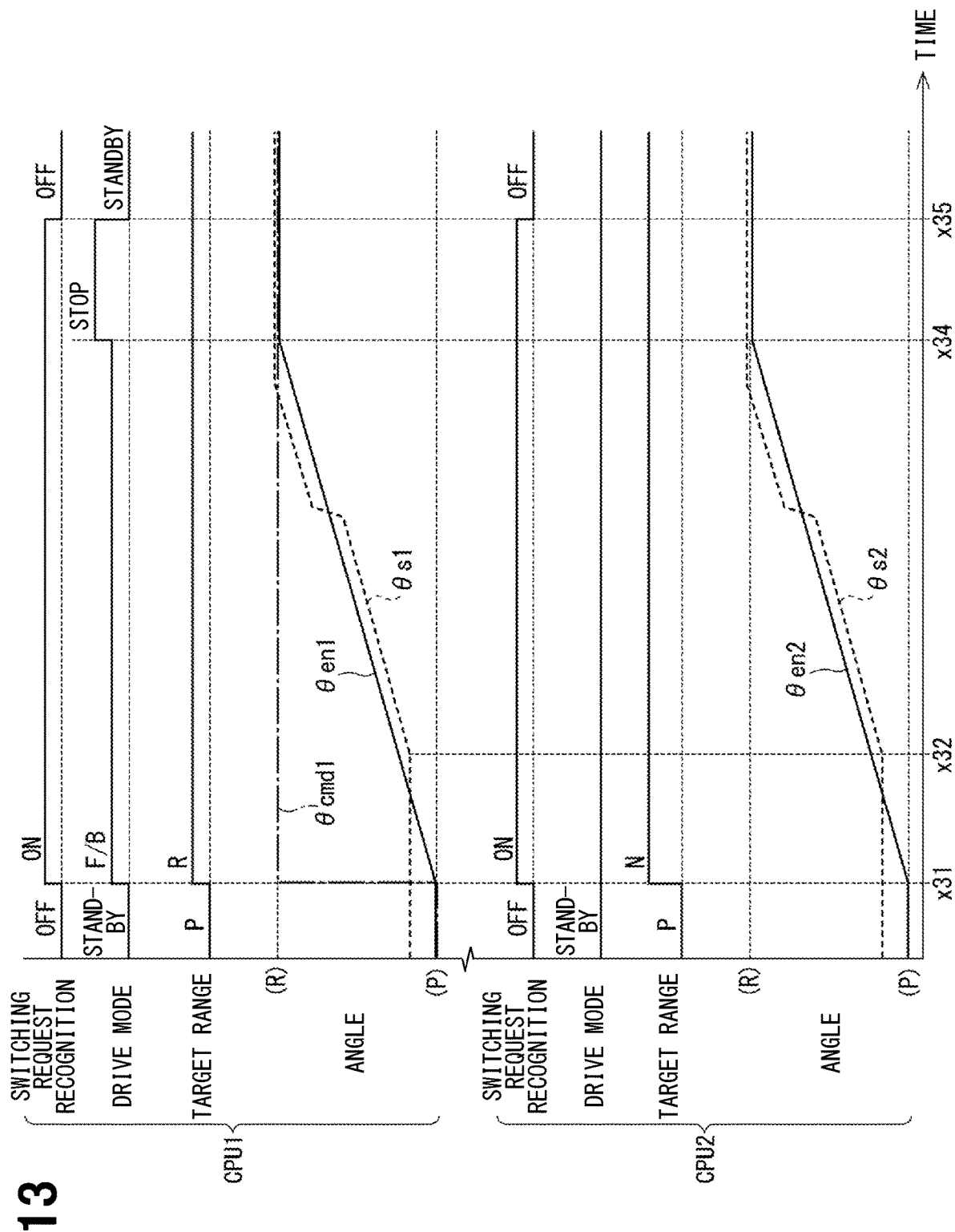
FIG. 13 is a time chart illustrating a case in which target ranges are inconsistent with each other according to the third embodiment.

The drive control process according to the present embodiment will be described with reference to time charts of FIGS. 13 to 18. As shown in FIG. 13, when the controllers 51 and 52 recognize the switching request at a time x31, the target range of the first controller 51 is switched to the R range, and the target range of the second controller 52 is switched to the N range. When the target ranges are different from each other, the target count values θcmd1 and θcmd2 are set to different values, and a mismatch may occur in the drive control of the motor 10. Therefore, when the target ranges do not coincide with each other in the controllers 51 and 52, the second controller 52 does not switch the drive mode to the feedback mode, and maintains the standby mode. As a result, the motor control in the second system is cancelled, and the motor 10 is driven in the first system. The process after the time x32 is similar to the process after the time x12 in FIG. 7.

Figure 14:
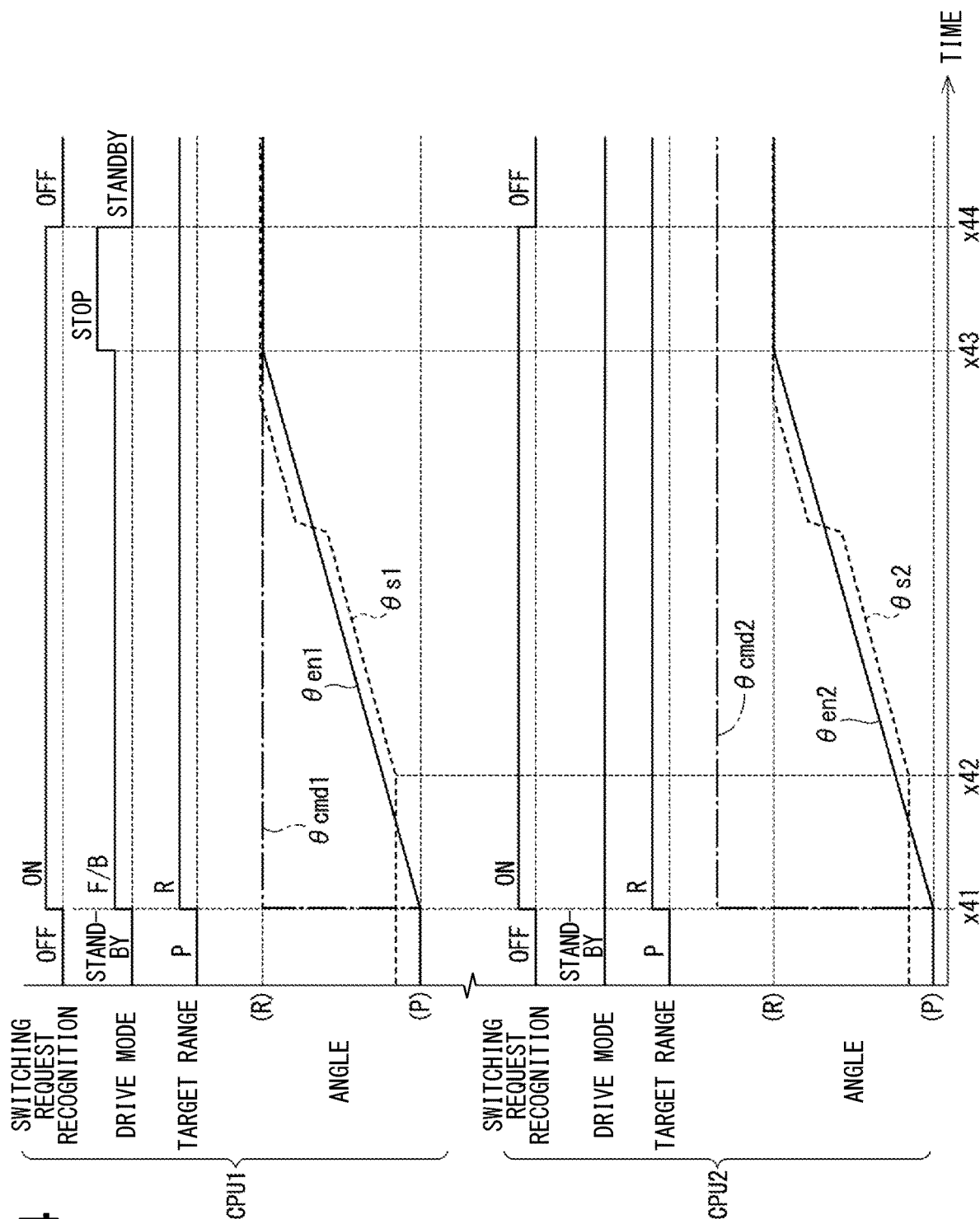
FIG. 14 is a time chart illustrating a case in which target count values are inconsistent with each other according to the third embodiment.

As shown in FIG. 14, when the controllers 51 and 52 recognize the switching request at a time x41, the target count values θcmd1 and θcmd2 corresponding to the target range are set. The target count value θcmd1 is set to a value corresponding to the R range, and the target count value θcmd2 is set to a value different from the value corresponding to the R range. In this example, since the target count values θcmd1 and θcmd2 do not coincide with each other in the controllers 51 and 52, the second controller 52 does not switch the drive mode to the feedback mode and holds the standby mode. As a result, the motor control in the second system is cancelled, and the motor 10 is driven in the first system. The processing after the time x42 is similar to the processing after x12 in FIG. 7.

Figure 15:
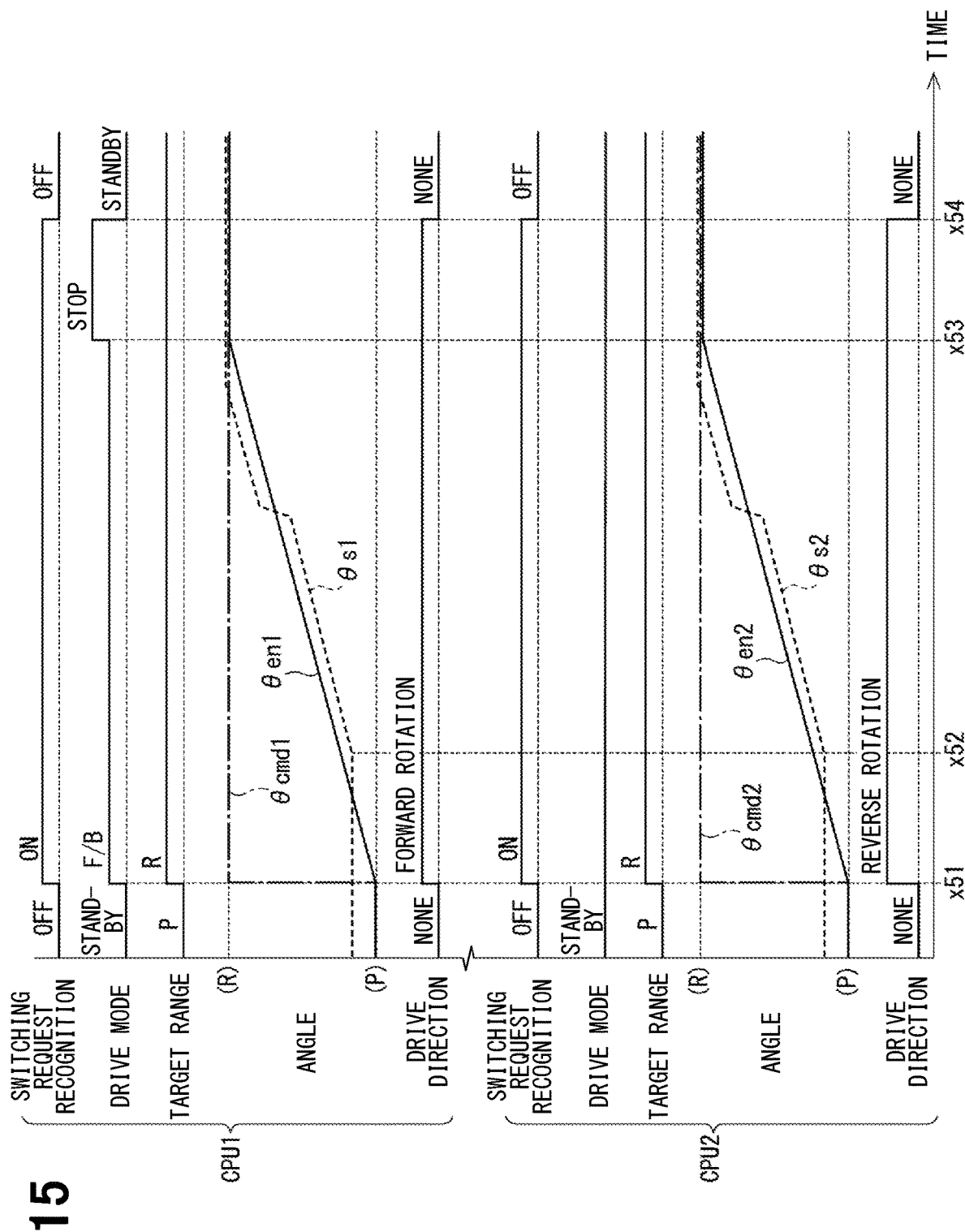
FIG. 15 is a time chart illustrating a case in which drive directions are inconsistent with each other according to the third embodiment.

In FIG. 15, the drive direction is described in the lower part of the angle of each system. As shown in FIG. 15, when the controllers 51 and 52 recognize the switching request at a time x51, the drive direction is set. Since the drive direction is set to a forward rotation in the first controller 51 and the drive direction is set to a reverse rotation in the second controller 52, and the drive direction is different from each other, the second controller 52 does not switch the drive mode to the feedback mode, and maintains the standby mode. As a result, the motor control in the second system is cancelled, and the motor 10 is driven in the first system. The processing after the time x52 is similar to the processing after x12 in FIG. 7.

Figure 16:
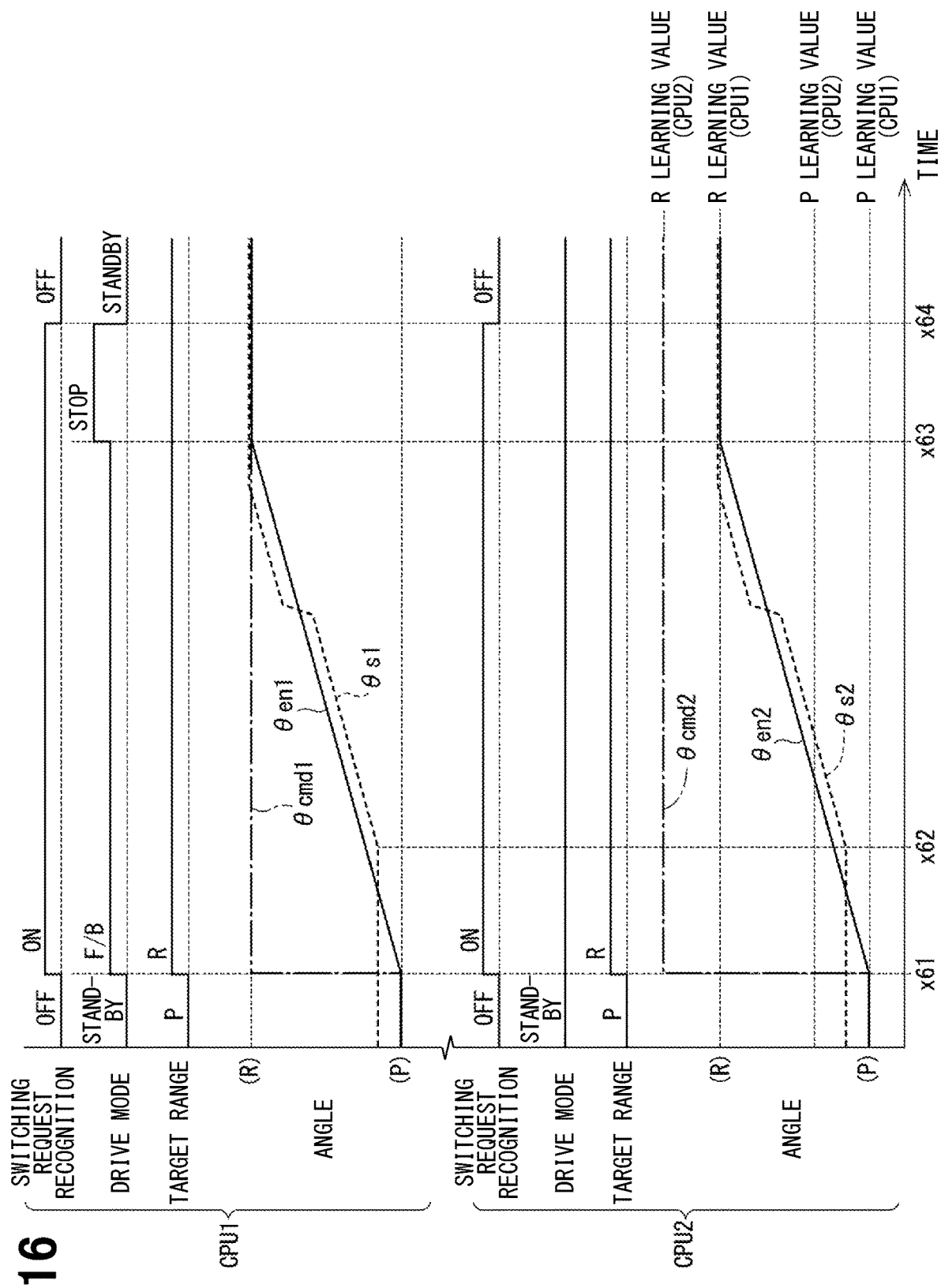
FIG. 16 is a time chart illustrating a case in which bottom position learning values are inconsistent with each other according to the third embodiment.

In FIG. 16, the P learning value and the R learning value, which are the bottom position learning values of the controllers 51 and 52, are described in an angle column of the second system. The bottom position learning value is learned by an initial driving or the like after a start switch, which is an ignition switch or the like of the vehicle, is turned on, and is stored in a storage unit (not shown), and there is a possibility that an error may occur due to bit conversion or the like. When the controllers 51 and 52 recognize the switching request at a time x61, since the P learning value and the R learning value are different between the controllers 51 and 52, the second controller 52 does not switch the drive mode to the feedback mode, but holds the standby mode. As a result, the motor control in the second system is cancelled, and the motor 10 is driven in the first system. The process after a time x62 is similar to the process after x12 in FIG. 7. In the present embodiment, the learning value is set as the bottom position learning value, but when the target count value θcmd is set by use of a wall position learning value which is the encoder count value when the detent roller 26 abuts against a wall portion on the P side or a wall portion on the D side of the recess portion 22, the wall position learning value may be set as the "learning value".

Figure 17:
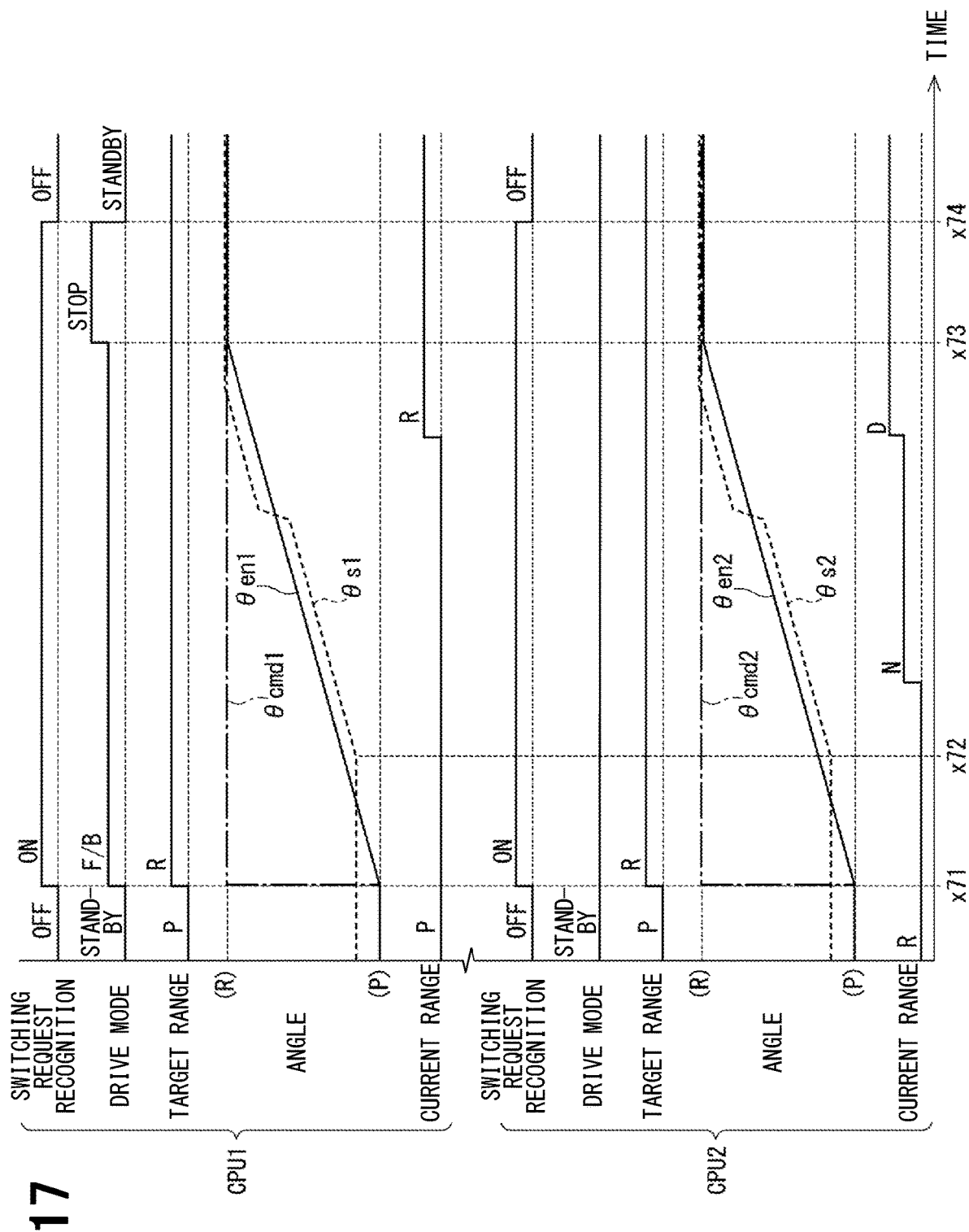
FIG. 17 is a time chart illustrating a case in which current ranges are inconsistent with each other according to the third embodiment.

In FIG. 17, the current range is shown under the angle of each system. For example, when the output shaft sensors 161 and 162 are deviated from each other, a range different from the actual range may be detected. When the current range is different from each other, the calculation of the target count values θcmd1 and θcmd2 may be affected. When the controllers 51 and 52 recognize the switching request at a time x71, the current range in the first controller 51 is the P range, the current range in the second controller 52 is the R range, and the current range is different from each other. For that reason, the second controller 52 does not switch the drive mode to the feedback mode, and maintains the standby mode. As a result, the motor control in the second system is cancelled, and the motor 10 is driven in the first system. The process after a time x72 is similar to the process after x12 in FIG. 7.

Figure 18:
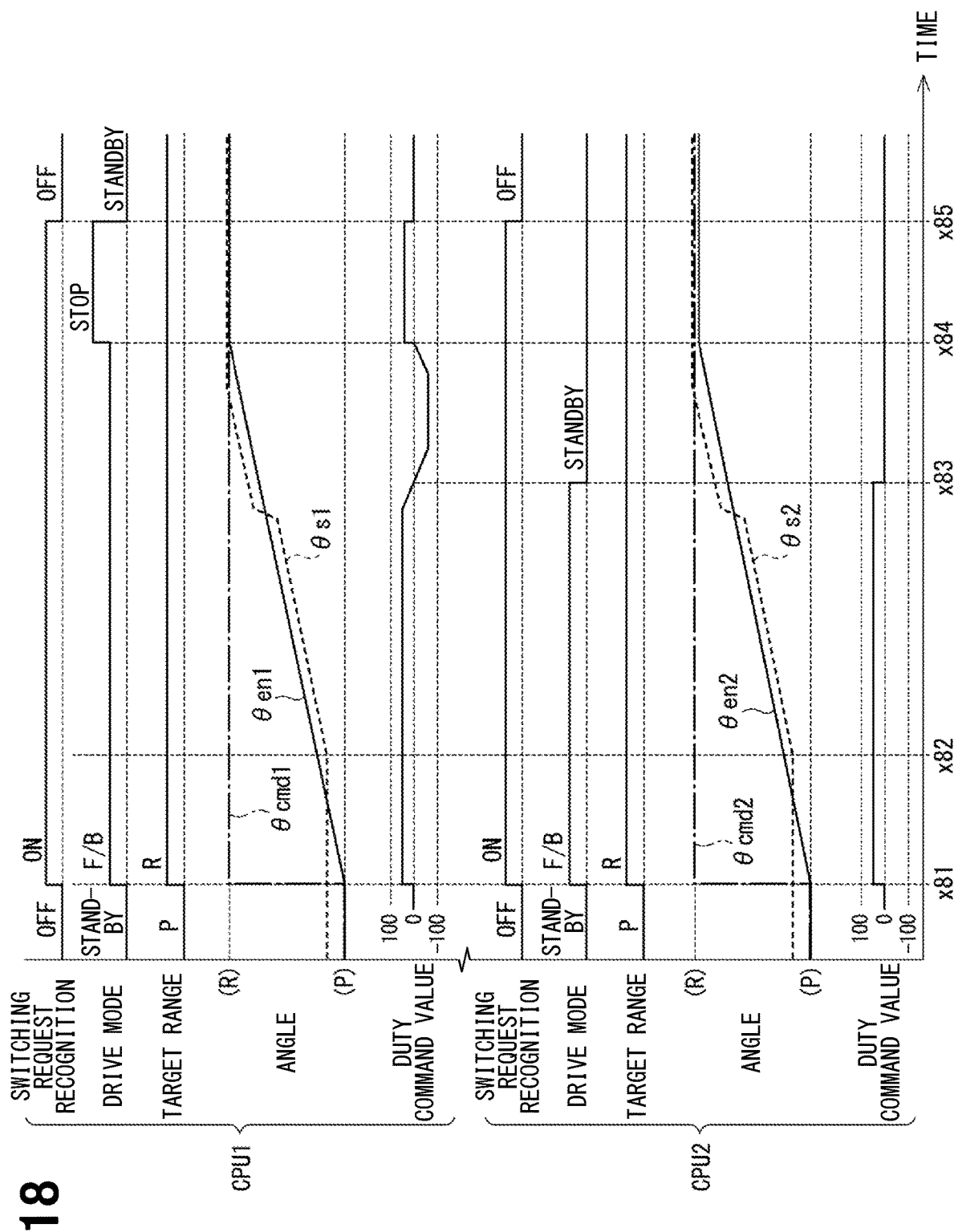
FIG. 18 is a time chart illustrating a case in which energization duty command values are inconsistent with each other according to the third embodiment.

In FIG. 18, the energization duty command value is shown under the angle of each system. The same applies to FIG. 20. When the controllers 51 and 52 recognize the switching request at a time x81, since the information related to the drive control of the motor 10 coincide between the systems, the driving of the motor 10 in the two systems is started. More specifically, the controllers 51 and 52 drive the motor 10 by switching the drive mode from the standby mode to the feedback mode and controlling the on-off operation of the switching elements 411 to 416 and 421 to 426 based on the encoder count values θen1 and θen2 and the set energization duty command value.

At a time x82, the first controller 51 decreases the energization duty command value, and the second controller 52 maintains the previous energization duty command value. At a time x83, the energization duty command value of the first controller 51 is switched from positive to negative. In the present embodiment, the duty at the time of acceleration is positive and the duty at the time of deceleration is negative, and when the positive and negative of the duty differ between the first system and the second system, one system attempts to accelerate the motor 10 and the other system attempts to decelerate the motor 10, and there is a possibility that a control mismatch occurs, the driving of the motor 10 is inhibited, the motor 10 is locked, or unintended behavior occurs.

For that reason, at the time x83 when the positive and negative of the energization duty command values are different between the controllers 51 and 52, the second controller 52 switches the drive mode from the feedback mode to the standby mode, and cancels the motor control in the second controller 52. As a result, a control mismatch can be avoided, and the motor 10 is driven in the first system after the time x83. The processes at a time x84 and a time x85 are similar to the processes at the time x15 and the time x16 in FIG. 7.

In the present embodiment, the first controller 51 is set in advance as the "continuation controller" and the second controller 52 is set in advance as the "stop controller". Thereby, it may be possible to prevent all the systems from being stopped due to the inconsistency of the control information.

The control information includes an energization duty command value related to on-off control of the switching elements 411 to 416 and 421 to 426 of the motor drivers 41 and 42 for switching the energization of the motor 10, or a parameter used for calculation of the energization duty command value.

Thereby, it may be possible to prevent the control mismatch caused by inconsistency of the energization duty command value. In particular, when one energization duty command value is a positive value and the other energization duty command value is a negative value, one command value becomes an acceleration command and the other command value becomes a deceleration command, so that the motor 10 may be locked. Therefore, in the present embodiment, when the positive and negative of the energization duty command value are different from each other, the control by one command value is stopped to prevent the control mismatch, and the motor 10 can be appropriately driven. In addition, the same effects as those of the above embodiment can be obtained.

The control information includes the target count value θcmd, which is set according to the target range and is a target stop position at which the motor 10 is stopped, or a parameter related to calculation of the target count value. In the present embodiment, the target range, the current range, and the bottom position learning value are included in the "parameter related to the calculation of the target stop position". Thereby, it may be possible to prevent the control mismatch due to inconsistency of the target count value θcmd or the parameter related to the calculation of the target count value θcmd. The control information according to the present embodiment includes the drive direction of the motor 10. This can prevent control mismatch due to the inconsistency of the drive direction.

Fourth Embodiment

Figure 19:
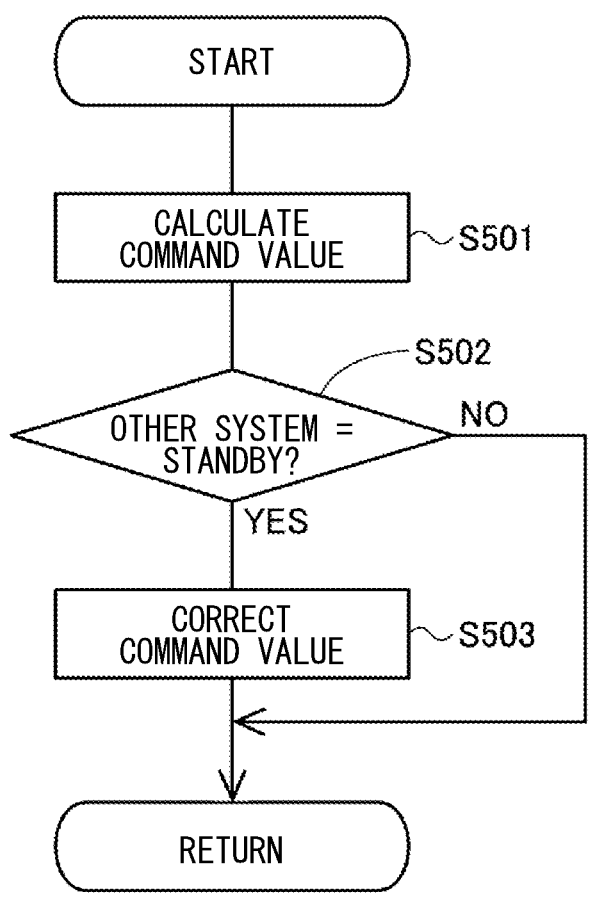
FIG. 19 is a flowchart illustrating a command calculation process according to a fourth embodiment.
Figure 20:
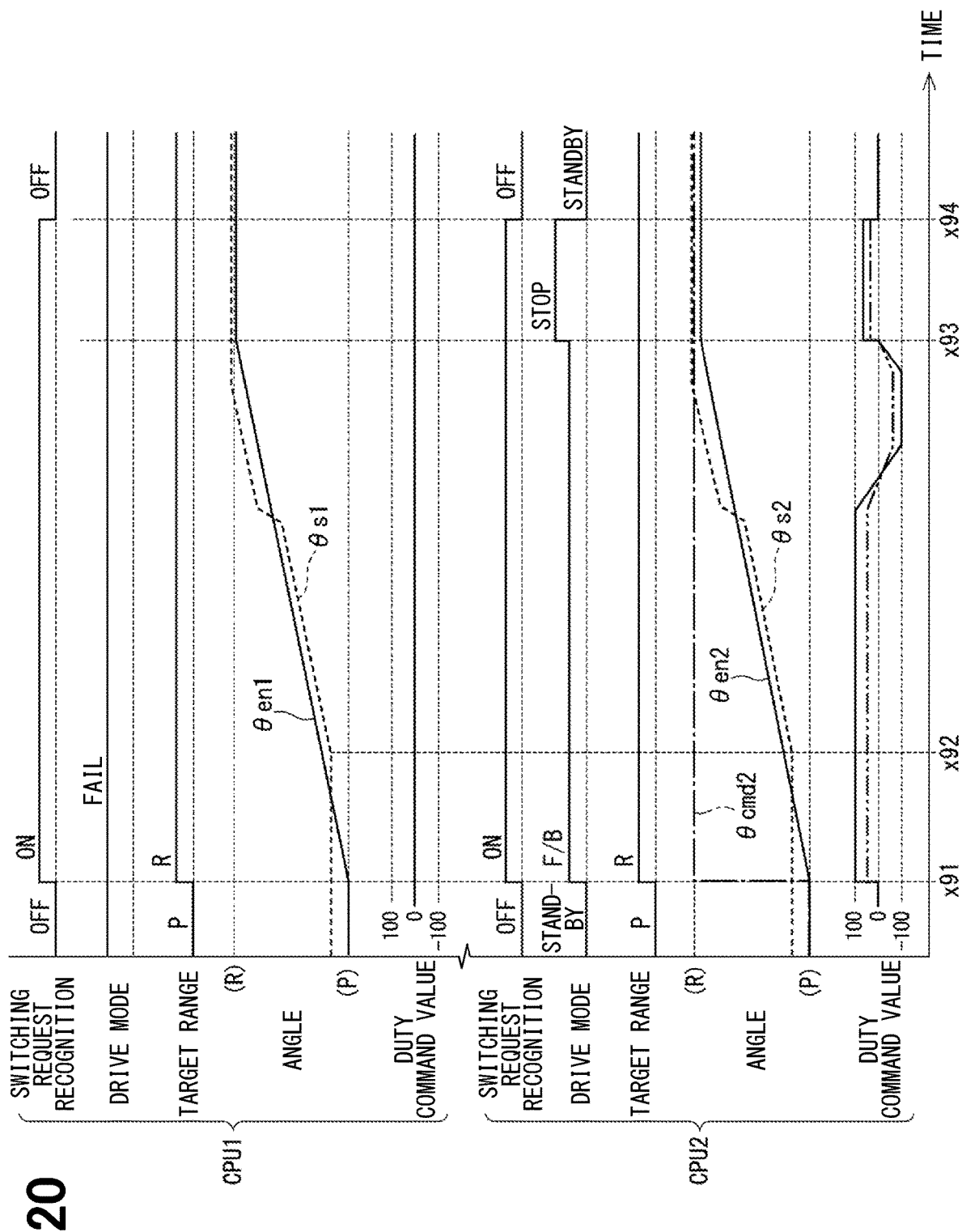
FIG. 20 is a time chart illustrating a drive control process according to the fourth embodiment.

A fourth embodiment is shown in FIGS. 19 and 20. In the present embodiment, when an abnormality occurs in one system and a fail mode is set, a motor 10 is driven by the other system. In this example, the fail mode is set separately from the drive mode. In the fail mode, the drive mode is the standby mode.

When the motor 10 is driven by one system, the torque is lowered as compared with the two-system driving, and therefore, it may take time to switch the range as compared with the two-system driving. Therefore, in the present embodiment, the energization duty command value is corrected in the one-system driving.

The command calculation process according to the present embodiment will be described with reference to a flowchart of FIG. 19. This process is executed in a predetermined cycle (for example, 1 [ms]) when the drive mode is a mode other than the standby mode, that is, in the present embodiment, when the drive mode is the feedback mode or the stop mode. In this example, it is assumed that the first system is fail-stopped, and the process of the second controller 52 will be described. In the present embodiment, the first controller 51 of the first system which is failed is a "stop controller" and the second controller 52 is a "continuation controller".

In S501, the second controller 52 calculates the energization duty command values based on the respective parameters. In S502, the second controller 52 determines whether the drive mode of the other system is the standby mode. When it is determined that the drive mode of the other system is not the standby mode (NO in S502), the process of S503 is not executed, and the drive control of the motor 10 is performed by use of the energization duty command value calculated in S501. When it is determined that the drive mode of the other system is the standby mode (YES in S502), the process proceeds to S503.

In S503, the second controller 52 corrects the energization duty command value calculated in S501. In the present embodiment, the energization duty command value calculated in S501 is doubled in order to compensate for a torque amount output by the first system at the time of two-system driving. When the doubled value is 100 or more, the value is set to 100, and when the doubled value is −100 or less, the value is set to −100. As a result, a torque shortage can be eliminated, and a responsiveness at the time of driving of one system can be improved.

The drive control process according to the present embodiment will be described with reference to a time chart of FIG. 20. In FIG. 20, in the energization duty command value, a value at the time of driving in one system is indicated by a solid line, and a value at the time of driving in two systems is indicated by a two-dot chain line.

At a time x91, the controllers 51 and 52 recognize the switching request. At this time, since the drive mode of the first controller 51 is the fail mode, the motor 10 is driven by the second system. In other words, since the motor 10 is driven in one system, the energization duty command value in the second controller 52 is doubled at the time of driving in the two system. The control from a time x92 to a time x94 is similar to the process of the first controller 51 from the time x13 to the time x15 in FIG. 7 except that the energization duty command value is changed from the time of the two-system driving. Since the motor 10 is driven by the second system, the encoder count value θen1 of the first system changes in the similar manner to the encoder count value θen2 of the second system, and the output shaft angle θs1 of the first system changes in the similar manner to the output shaft angle θs2 of the second system.

In the present embodiment, when one of the systems is fail, the energization duty command value of the normal system is doubled. In this example, in the above embodiment, when the recognition timing of the range switching request deviates from each other, or when the information related to the drive control of the motor 10 differs between the systems, the motor 10 is driven by one system. Not only when one system is failed, but also when one system is driven due to inconsistency of control information as shown in the above embodiments, the energization duty command value of the first system may be doubled.

In the present embodiment, when the drive control of the motor 10 by the first controller 51 is stopped, the second controller 52 changes the energization duty command value from the case in which the drive control of the motor 10 is performed by use of all the controllers 51 and 52. In the present embodiment, at the time of the one-system driving, although the energization duty command value is twice as large as the two-system driving, the energization duty command value is not limited to twice, and the energization duty command value is changed so as to compensate for the torque of at least a portion of the reduced number of drive systems. Thereby, it may be possible to reduce the effect of torque shortage or the like caused by stopping a part of the system. In addition, the similar effects as those of the above embodiment can be obtained.

In the first to third embodiments, the first controller 51 corresponds to a "continuation controller" and the second controller 52 corresponds to a "stop controller", and in the fourth embodiment, the first controller 51 corresponds to a "stop controller" and the second controller 52 corresponds to a "continuation controller". The motor drivers 41 and 42 correspond to a "drive circuit", the drive mode corresponds to a "drive state information", and the target count value θcmd corresponds to a "target stop position".

Other Embodiments

In the above embodiments, the motor is a DC brushless motor. In another embodiment, the motor may be other than a DC brushless motor. In the above embodiments, two motor drive control systems are provided. In another embodiment, three or more motor drive control systems may be provided. When the number of controllers is three or more, at least one of the "first controller" and the "second controller" may be plural.

In the third embodiment, it is determined in S447 in FIG. 12 whether the positive and negative of the energization duty command values coincide with each other. In another embodiment, it may be determined in S447 whether a difference between the energization duty command values is equal to or greater than a determination threshold, and when the difference is equal to or greater than the determination threshold, it may be determined that the information is inconsistent with each other.

Figure 21:
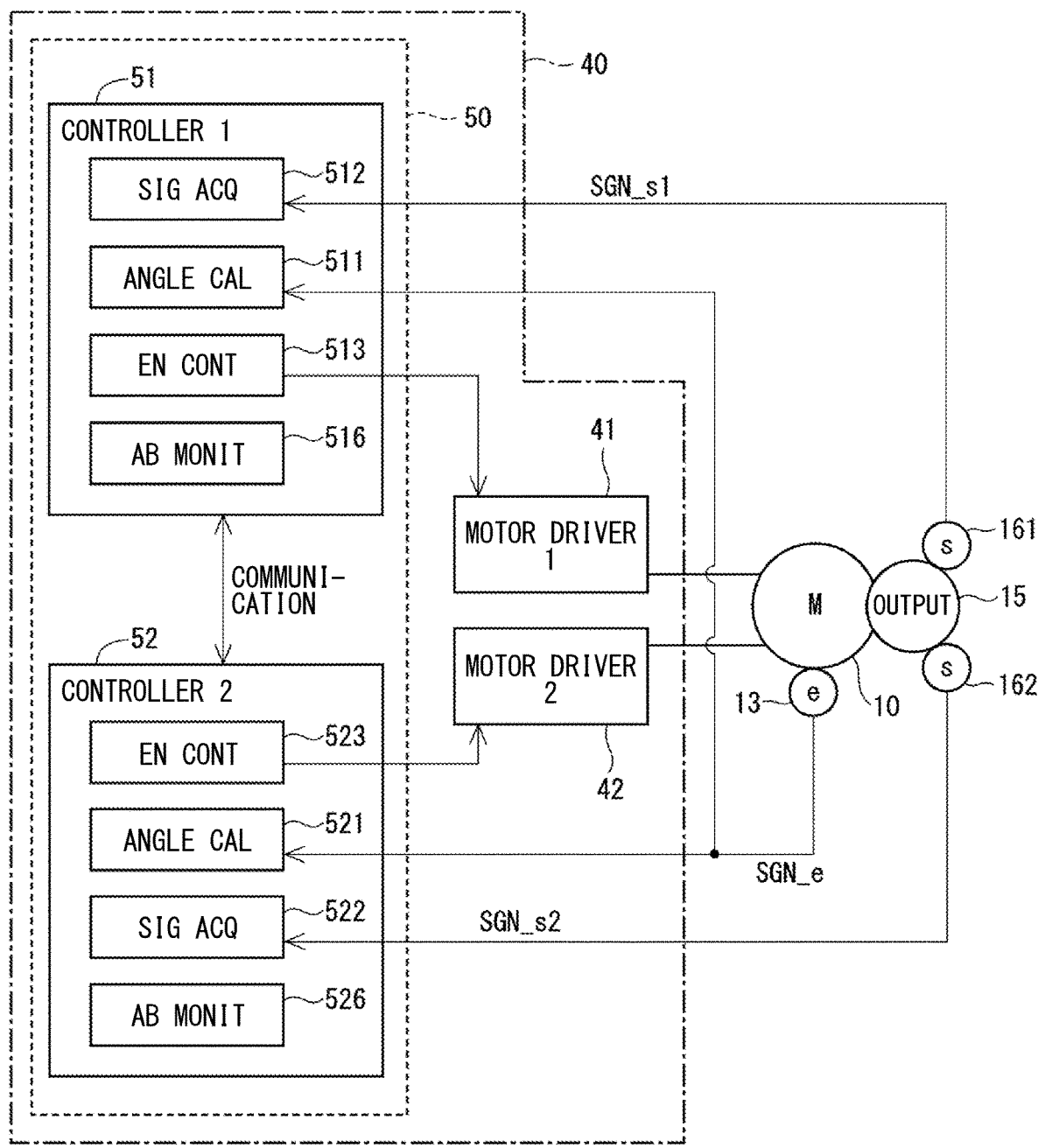
FIG. 21 is a block diagram showing a shift range control device according to another embodiment.

In the above embodiments, the encoder is provided for each system. In another embodiment, as shown in FIG. 21, the encoder signal SGN_e of one encoder 13 may be shared by the controllers 51 and 52. In the similar manner, in the output shaft sensor, the detection value of one output shaft sensor may be shared by multiple systems.

In the above embodiments, the motor rotation angle sensor is a three-phase encoder. In another embodiment, the motor rotation angle sensor may be a two-phase encoder, or may be not limited to an encoder, and a resolver or the like may be used. In the above embodiments, a potentiometer is exemplified as the output shaft sensor. In another embodiment, an output shaft sensor other than a potentiometer may be used, or the output shaft sensor may be omitted.

In the above embodiments, the detent plate is provided with four recess portions. In another embodiment, the number of recess portions is not limited to four and may be any number. For example, two recess portions of the detent plate may be used to switch between the P range and notP range. The shift range switching mechanism, the parking lock mechanism, and the like may be different from those of the above embodiments.

In the above embodiments, a speed reducer is provided between the motor shaft and the output shaft. Although the details of the speed reducer are not mentioned in the above embodiments, any configuration may be adopted, for example, a cycloid gear, a planetary gear, a spur gear for transmitting a torque from a speed reduction mechanism substantially coaxial with the motor shaft to the drive shaft, or a combination of those components may be used. In another embodiment, the speed reducer between the motor shaft and the output shaft may be omitted, or a mechanism other than the speed reducer may be provided.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A shift range control device for controlling driving of a motor to switch a shift range, the shift range control device comprising:
a plurality of controllers configured to
communicate with each other and
control the driving of the motor,
wherein:
the plurality of controllers are configured to share control information related to a drive control of the motor;
the plurality of controllers include a first controller and a second controller;
when the control information of the first controller is different from the control information of the second controller, one of the first controller and the second controller is set as a continuation controller, and a different one of the first controller and the second controller is set as a stop controller;
the stop controller is configured to stop the drive control; and
the continuation controller is configured to perform the drive control of the motor.

2. The shift range control device according to claim 1, wherein:
the control information is drive state information related to a drive state of the motor; and
when one controller among the plurality of controllers is configured to recognize a range switching request while a different controller other than the one controller among the plurality of controllers is configured to drive the motor, the different controller is set as the continuation controller, the one controller is set as the stop controller; and
the stop controller is configured not to start the drive control of the motor to continue stopping.

3. The shift range control device according to claim 1, wherein:
the control information is an energization duty command value related to an on-off control of a switching element of a drive circuit that switches energization of the motor, or a parameter used for calculation of the energization duty command value.

4. The shift range control device according to claim 3, wherein:
the first controller is predetermined as the continuation controller, and the second controller is predetermined as the stop controller.

5. The shift range control device according to claim wherein:
the drive circuit is configured to switch the energization of the motor and includes the switching element;
when the stop controller is configured to stop the drive control of the motor, the continuation controller is configured to set the energization duty command value that is related to the on-off control of the switching element and is different from an energization value in accordance with a case where all of the plurality of controllers are used for performing the drive control of the motor.

6. The shift range control device according to claim 1, wherein:

the control information is set in accordance with a target range, and is a target stop position where the motor stops or a parameter related to calculation of the target stop position.

7. The shift range control device according to claim 6, wherein:
the first controller is predetermined as the continuation controller, and the second controller is predetermined as the stop controller.

8. The shift range control device according to claim 1, wherein:
the control information is a drive direction of the motor.

9. The shift range control device according to claim 8, wherein:
the first controller is predetermined the continuation controller, and the second controller is predetermined as the stop controller.

10. The shift range control device according to claim 1, wherein:
all of the plurality of controllers are configured to perform the drive control of the motor when an inconsistency of the control information is resolvable or the inconsistency is resolved within a determination waiting time after the inconsistency is detected, and
the stop controller is configured to stop the drive control of the motor when the inconsistency of the control information continues over the determination waiting time.

11. The shift range control device according to claim 10, wherein:
at least one controller among the plurality of controllers is configured to determine the inconsistency between the control information of the at least one controller and the control information of a controller different from the at least one controller among the plurality of controllers.

12. The shift range control device according to claim 1, further comprising:
a plurality of drive circuits
configured to drive the motor, and
include a first drive circuit connected to the motor and a second drive circuit connected to the motor,
wherein:
the stop controller is configured to interrupt the first drive circuit to stop the drive control in accordance with the first drive circuit; and
the continuation controller is configured to drive the second drive circuit to perform the drive control in accordance with the second drive circuit.

13. A shift range control device for controlling driving of a motor to switch a shift range, the shift range control device comprising:
a plurality of controllers that includes a first controller and a second controller; and
a plurality of drive circuits that include a first drive circuit connected to the motor and a second drive circuit connected to the motor,
wherein:
the first controller and the second controller are configured to communicate with each other;
the first controller that includes:
one or more first processors; and
a first memory coupled to the one or more first processors and storing program instructions that when executed by the one or more first processors cause the one or more first processors to at least:
control the first drive circuit to drive the motor; and share first control information related to a drive control of the motor with the second controller; and
the second controller that includes:
one or more second processors; and
a second memory coupled to the one or more second processors and storing program instructions that when executed by the one or more second processors cause the one or more second processors to at least:
control the second drive circuit to drive the motor; and
share second control information related to the drive control of the motor with the first controller; and
when the first control information is different from the second control information, the first controller is configured to cause the first drive circuit to start the driving of the motor and the second controller is configured to cause the second drive circuit not to start the driving of the motor.

* * * * *